(12) United States Patent
Bechhoefer et al.

(10) Patent No.: US 8,639,458 B2
(45) Date of Patent: Jan. 28, 2014

(54) TECHNIQUES FOR USE WITH ROTOR TRACK AND BALANCE TO REDUCE VIBRATION

(75) Inventors: Eric Robert Bechhoefer, New Haven, VT (US); Eric Carter, Panton, VT (US); Dan Hiatt, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 602 days.

(21) Appl. No.: 12/658,084

(22) Filed: Feb. 2, 2010

(65) Prior Publication Data

US 2011/0191040 A1    Aug. 4, 2011

(51) Int. Cl.
*G01F 17/00* (2006.01)
*B64C 27/00* (2006.01)
*G05B 21/00* (2006.01)

(52) U.S. Cl.
USPC .......................... 702/56; 244/17.11; 700/280

(58) Field of Classification Search
USPC ................. 702/56, 33–36, 41, 66, 75–77, 81, 702/84–85, 105, 127, 141, 145, 147, 702/150–151, 173, 182–183, 189, 196; 244/17.11, 17.21, 17.23; 73/1.37, 1.79, 73/1.82, 66, 460, 475–476, 570, 581, 583, 73/649; 701/3, 14, 29; 700/275, 279–280
See application file for complete search history.

(56) References Cited

U.S. PATENT DOCUMENTS

| | | | |
|---|---|---|---|
| 6,415,206 B1 * | 7/2002 | Ventres ........................ | 700/279 |
| 6,567,757 B2 | 5/2003 | Bechhoefer et al. ............ | 702/56 |
| 6,574,572 B2 | 6/2003 | Bechhoefer ..................... | 702/56 |
| 6,950,763 B1 | 9/2005 | Bechhoefer ..................... | 702/56 |
| 7,272,513 B2 | 9/2007 | Bechhoefer ..................... | 702/56 |
| 7,512,463 B1 | 3/2009 | Bechhoefer ........................ | 701/3 |
| 8,041,520 B2 * | 10/2011 | Mesec ............................. | 702/58 |
| 2002/0095242 A1 * | 7/2002 | Bechhoefer ................... | 700/279 |

OTHER PUBLICATIONS

He et al., Probabilistic Model Based Algorithms for Prognostics, 2006 IEEE, 10 pp.*
Bechhoefer et al., "IMD HUMS Rotor Track and Balance Techniques," IEEE Aerospace Conference Proceedings, 2003 IEEE, vol. 7, Mar. 8-15, 2003, pp. 3205-3211.
S. J. Orfanidis, *Optimum Signal Processing*, Chapter 4, "Linear Estimation of Signals," New York, 2007, pp. 117-146.

* cited by examiner

*Primary Examiner* — Toan Le
(74) *Attorney, Agent, or Firm* — Cantor Colburn LLP

(57) ABSTRACT

Described are techniques for selecting options used with current sensor data characterizing vibration caused by rotating blades. Sets of other sensor data are evaluated to determine a first of the sets of other sensor data that is a best match for said current sensor data. Each of the sets of other sensor data is associated with one of a plurality of option sets. Each option set includes options used in determining one or more adjustments that may be applied to the blades to reduce vibration. The one or more sets of other sensor data are evaluated to determine a first of the sets of other sensor data that is a best match for said current sensor data. A first of the plurality of option sets associated with said first set of sensor data is used in determining adjustment(s) that may be applied to the blades.

19 Claims, 15 Drawing Sheets

| Decision spaces 502 | Sensor 1 | | | | | | | ... | Sensor NN | | | | | | |
|---|---|---|---|---|---|---|---|---|---|---|---|---|---|---|---|
| | Regime 1 | | | | Regime M | | | | Regime 1 | | | | Regime M | | |
| | SO1 | | SO2 | | SO1 | | SO2 | | SO1 | | SO2 | | SO1 | | SO2 |
| | Value | Pty | Value | Pty | Value | Pty | Value | Pty | Value | Pty | Value | Pty | Value | Pty | Value | Pty |
| Decision space 1 | | | | | | | | | | | | | | | | |
| Decision space 2 | | | | | | | | | | | | | | | | |
| ... ... | | | | | | | | | | | | | | | | |
| Decision space n | | | | | | | | | | | | | | | | |

Previously obtained sensor data 504

CABIN ROLL — 652

| Index | Ground so1 | | | Hover so1 | | | Hover so2 | | | 120Kts so1 | | | 120Kts so2 | | | 140Kts so1 | | | 140Kts so2 | | | 150Kts so1 | | | 150Kts so2 | | |
|---|---|---|---|---|---|---|---|---|---|---|---|---|---|---|---|---|---|---|---|---|---|---|---|---|---|---|---|
| | ips | Pty | | ips | Pty | | ips | Pty | | ips | Pty | | ips | Pty | | ips | Pty | | ips | Pty | | ips | Pty | | ips | Pty |
| 1 | 0.2 | 1.0 | | 0.2 | 0.2 | 1.0 | 0.2 | 1.0 | | 0.2 | 1.0 | | 0.2 | 1.0 | | 0.2 | 1.0 | | 0.2 | 1.0 | | 0.2 | 1.0 | | 0.2 | 1.0 |
| 2 | 0.2 | 1.0 | | 0.2 | 0.2 | 1.0 | 0.2 | 1.0 | | 0.2 | 1.0 | | 0.2 | 1.0 | | 0.3 | 7.0 | | 0.3 | 7.0 | | 0.3 | 8.0 | | 0.3 | 8.0 |
| 3 | 0.3 | 10.0 | | 0.0 | 0.3 | 8.0 | 0.0 | 1.0 | | 0.2 | 4.0 | | 0.0 | 1.0 | | 0.1 | 1.0 | | 0.0 | 1.0 | | 0.1 | 1.0 | | 0.0 | 1.0 |
| 4 | 0.2 | 1.0 | | 0.2 | 0.2 | 1.0 | 0.2 | 1.0 | | 0.2 | 1.0 | | 0.2 | 1.0 | | 0.2 | 1.0 | | 0.2 | 1.0 | | 0.2 | 1.0 | | 0.2 | 1.0 |
| 5 | 0.2 | 1.0 | | 0.2 | 0.2 | 1.0 | 0.2 | 1.0 | | 0.2 | 1.0 | | 0.2 | 1.0 | | 0.3 | 7.0 | | 0.3 | 7.0 | | 0.3 | 8.0 | | 0.3 | 8.0 |

CABIN LATERAL — 654

| Index | Ground so1 | | | Hover so1 | | | Hover so2 | | | 120Kts so1 | | | 120Kts so2 | | | 140Kts so1 | | | 140Kts so2 | | | 150Kts so1 | | | 150Kts so2 | | |
|---|---|---|---|---|---|---|---|---|---|---|---|---|---|---|---|---|---|---|---|---|---|---|---|---|---|---|---|
| | ips | Pty | | ips | Pty | | ips | Pty | | ips | Pty | | ips | Pty | | ips | Pty | | ips | Pty | | ips | Pty | | ips | Pty |
| 1 | 0.2 | 1.0 | | 0.2 | 0.2 | 1.0 | 0.2 | 1.0 | | 0.2 | 1.0 | | 0.2 | 1.0 | | 0.2 | 1.0 | | 0.2 | 1.0 | | 0.2 | 1.0 | | 0.2 | 1.0 |
| 2 | 0.2 | 1.0 | | 0.2 | 0.2 | 1.0 | 0.2 | 1.0 | | 0.2 | 1.0 | | 0.2 | 1.0 | | 0.3 | 7.0 | | 0.3 | 7.0 | | 0.3 | 8.0 | | 0.3 | 8.0 |
| 3 | 0.3 | 10.0 | | 0.0 | 0.3 | 8.0 | 0.0 | 1.0 | | 0.2 | 4.0 | | 0.0 | 1.0 | | 0.1 | 1.0 | | 0.0 | 1.0 | | 0.1 | 1.0 | | 0.0 | 1.0 |
| 4 | 0.2 | 1.0 | | 0.2 | 0.2 | 1.0 | 0.2 | 1.0 | | 0.2 | 1.0 | | 0.2 | 1.0 | | 0.2 | 1.0 | | 0.2 | 1.0 | | 0.2 | 1.0 | | 0.2 | 1.0 |
| 5 | 0.2 | 1.0 | | 0.2 | 0.2 | 1.0 | 0.2 | 1.0 | | 0.2 | 1.0 | | 0.2 | 1.0 | | 0.3 | 7.0 | | 0.3 | 7.0 | | 0.3 | 8.0 | | 0.3 | 8.0 |

FIGURE 13B

| Index | Track | | | | | | | | | |
|---|---|---|---|---|---|---|---|---|---|---|
| | Ground | | Hover | | 120 | | 140 | | 150 | |
| | Spt | Pty | Spt | Pty | Spt | Pty | Spt | Pty | Spt | Pty |
| 1 | 12.0 | 5.0 | 15.0 | 5.0 | 20.0 | 6.0 | 25.0 | 6.0 | 30.0 | 6.0 |
| 2 | 12.0 | 5.0 | 15.0 | 5.0 | 20.0 | 6.0 | 25.0 | 6.0 | 30.0 | 6.0 |
| 3 | 0.0 | 1.0 | 0.0 | 1.0 | 0.0 | 1.0 | 0.0 | 1.0 | 0.0 | 1.0 |
| 4 | 12.0 | 3.0 | 12.0 | 3.0 | 12.0 | 3.0 | 12.0 | 3.0 | 12.0 | 3.0 |
| 5 | 12.0 | 3.0 | 12.0 | 3.0 | 12.0 | 3.0 | 12.0 | 3.0 | 12.0 | 3.0 |

FIGURE 13C

TECHNIQUES FOR USE WITH ROTOR TRACK AND BALANCE TO REDUCE VIBRATION

BACKGROUND OF THE INVENTION

1. Field of the Invention

This application relates to the field of vibration analysis and more particularly to the field of performing vibration analysis for the purpose of providing device adjustments that reduce vibrations.

2. Description of Related Art

Rotors which propel helicopters and other propeller-driven aircraft induce vibrations in the structure supporting the rotor. The vibrations occur at frequencies that correspond to the shaft rotation rate and harmonics thereof. The vibrations may result in a structural damage, crew fatigue, and ultimately become one of the factors limiting the maximum forward speed of the aircraft. Similar types of vibrations are produced by fans and compressors and fixed installations as well as by marine propellers.

A primary source of the vibration problem is non-uniform air loads on the blades, although mass imbalance is not uncommon. Aerodynamic anomalies, however, tend to develop recurrently due to blade wear, damage, deformation, etc. The aerodynamic and mass and stiffness distribution anomalies have often been called "tracking faults", since a primary observable feature of the uneven air loads or mass distribution is it tendency for the blades to flap and/or deflect unevenly, and thus follow different "tracks". The troublesome manifestation of the aerodynamic and mass imbalance, however, is usually the 1/rev and n/rev vibrations and not the track deviations themselves.

It is possible to modify the vibration characteristics of a helicopter by "rotor trimming", which involves adjusting the weight of the blades at the hub (weights), the tab setting(s) at one or more blades (tabs), and the adjustment on the pitch rods (pitch control rods or PCRs). However, determining the effect of each of these adjustments may be difficult because the interdependence of the adjustments. This interdependence may be the source of some difficulty with trial and error methods of rotor trimming, which may allow variation of only one type of adjustment at a time. One set of adjustments may be thrown out of kilter by a subsequent step in the process, requiring repetitive adjustments which may or may not converge to an acceptable state. Some helicopter rotor trim balancing methods rely, at least in part, upon making the track of each blade identical using, for example, known optical methods.

Mechanical balancing of rotors with mass imbalance may, in some cases, be performed with a single accelerometer and a shaft-phase reference sensor. However, uneven air loads may not be fully diagnosed and corrected with such a technique. Other techniques used to perform the rotor smoothing function may rely upon optical tracking in conjunction accelerometers. Known rotor smoothing systems, however, process vibration data in such a way that there may be an inherent ambiguity in the interpretation of the signatures. The ambiguity comes about because, in many cases, the number of channels processed simultaneously is inadequate to fully separate translational and rotational acceleration components at a given point. Thus, the motion of the helicopter (and in particular the rotor support) in response to a rotor anomalies may be incompletely specified. Furthermore, some systems may not deduce the corrections needed from the Fourier coefficients related to each anomaly.

Existing techniques for rotor smoothing may utilize a variety of different options, and combinations thereof, in connection with determining what adjustments to make to reduce vibration. An operator may have to provide a selection of one or more options as inputs to such a technique. For example, an operator using a technique for determining a set of adjustments for reducing vibration may be required to provide inputs selecting which one or more types of sensor data to use (e.g., vibration alone, vibration and tracking, tracking alone), selecting one or more optimization goals or solution strategies, and the like. Providing such inputs may be cumbersome and intimidating for an inexperienced user. Furthermore, an inexperienced user may select a set of inputs which may not be desirable given a current set of sensor data characterizing vibration in an existing system or arrangement. Similarly, a set of default inputs may not be desirable for the current set of sensor data characterizing the vibration in an existing system.

SUMMARY OF THE INVENTION

According to one aspect of the invention is a computer implemented method of selecting options for use with current sensor data. The current sensor data characterizing vibration caused by rotating blades is received. One or more sets of other sensor data are evaluated to determine a first of the one or more sets of other sensor data that is a best match for said current sensor data. Each of said one or more sets of other sensor data is associated with one of a plurality of option sets, and each of said plurality of option sets including one or more options for use in connection with determining one or more adjustments that may be applied to the blades to reduce vibration. The one option set associated with said each set of other sensor data indicates options previously determined as appropriate for use in connection with determining adjustments that may be applied to the blades when said each set of other sensor data characterizes a current state of vibration caused by rotating the blades. The one or more sets of other sensor data are evaluated to determine a first of the one or more sets of other sensor data that is a best match for said current sensor data. A first of the plurality of option sets associated with said first set of sensor data is used in connection with determining one or more adjustments that may be applied to the blades. Each of the plurality of option sets may indicate selection of options from a plurality of options, said plurality of options including at least one of a plurality of adjustment types, whether to determine an adjustment using vibration sensor data alone or in combination with track split data, and one of a plurality of solution strategies. The first option set may include one or more of said adjustment types and a first of said plurality of solution strategies. The method may also include determining an adjustment that may be applied to the blades in accordance with options of said first option set, said adjustment being a best adjustment determined by evaluating different combinations of adjustments of said one or more adjustment types included in said first option set using said first solution strategy. The sets of other sensor data may be associated with values used to weight said sets of other sensor data when evaluating which of said sets of other sensor data is a best match for said current sensor data. The evaluating may include determining, for each set of other sensor data, a normalized distance between said current sensor data and said each set of other sensor data. The normalized distance may be squared and weighted. The normalized distance squared may be weighted by an inverse covariance. The normalized distance squared may be weighted by a value indicating preference, importance, or a degree of confidence associated with said each set of other sensor data. The plurality of adjustment types may include a weight adjustment, a pitch control rod adjustment, and one or more tab adjustments. The one or more sets of other sensor data may include sensor data for a plurality of different sensors. The one or more sets of other sensor data may include sensor data for at least one sensor at a plurality of different flight regimes. At least one of the plurality of different sensors may be a virtual sensor. The one or more sets of other sensor data may include sensor data for one or more different vibration shaft orders. There may be K sets of other sensor data, each of said sets of other sensor data represented as $M_i$, "i" ranging from 1 to K, inclusively, and the method may include determining, for each Mj, j ranging from 2 to K, inclusively:

$$Hj = (z-M_1)^2 INF_1 - (z-M_j)^2 INF_j + \ln(\Pi INF_j)/\Pi INF_1$$

with respect to $M_1$ and each Mj, where $INF_1$ and $INFj$ represent weighting factors, $\Pi\ INF_1$ represents a mathematical product of weighting factors associated with $INF_1$, $\Pi\ INF_j$ represents a mathematical product of weighting factors associated with $INF_j$, and z represents the current sensor data. One of the option sets may be associated with each $M_i$ and the method may include selecting an option set associated with $M_1$ as said first option set if all Hj values are less than zero, Hj being determined with respect to $M_1$ and Mj, and otherwise, determining which one of said "j" sets of other sensor data produces a maximum Hj value, and selecting, as said first option set, an option set associated with said one set of sensor data producing the maximum Hj value.

In accordance with another aspect of the invention is a system that determines adjustments to decrease vibration caused by rotating blades. A data store includes a priori information about what one or more options are appropriate for use in connection with determining one or more adjustments that may be applied to the blades for each of different sets of sensor data. An option selection component evaluates said different sets of sensor data to determine which of said different sets of sensor data is a best match for a current set of sensor data characterizing a current state of measured vibration of the rotating blades. The option selection component selects the one or more options which are included in said a priori information and which are associated with a first of said different sets of sensor data determined as the best match. An adjustment determination component determines one or more adjustments which are best adjustments in accordance with said one or more options selected by the option selection component. The a priori information may includes weights associated with said different sets of sensor data. The a priori information may indicate which of a plurality of options are appropriate for use with each of the different sets of sensor data. The plurality of options may include one or more adjustment types, whether to determine an adjustment for the component using vibration sensor data alone or in combination with track split data, and one of a plurality of solution strategies. The or more adjustment types may include one or more of a weight adjustment, a pitch control rod adjustment, one or more tab adjustments. The different sets of sensor data may include sensor data for a plurality of different sensors at a plurality of different flight regimes for one or more vibration orders.

In accordance with another aspect of the invention is a computer readable medium comprising executable code stored thereon that selects options for use with current sensor data. The computer readable medium comprises executable code that: receives the current sensor data characterizing vibration caused by rotating blades; evaluates one or more sets of other sensor data to determine a first of the one or more sets of other sensor data that is a best match for said current sensor data, each of said one or more sets of other sensor data being associated with one of a plurality of option sets, each of said plurality of option sets including one or more options for use in connection with determining one or more adjustments that may be applied to the blades to reduce vibration, wherein said one option set associated with said each set of other sensor data indicates options previously determined as appropriate for use in connection with determining adjustments that may be applied to the blades when said each set of other sensor data characterizes a current state of vibration caused by rotating the blades; evaluates the one or more sets of other sensor data to determine a first of the one or more sets of other sensor data that is a best match for said current sensor data; and uses a first of the plurality of option sets associated with said first set of sensor data in connection with determining one or more adjustments that may be applied to the blades.

BRIEF DESCRIPTION OF DRAWINGS

FIGS. 11, 12, 13A, 13B and 13C are examples of a priori information illustrating what decision space is appropriate for a given set of sensor data.

DETAILED DESCRIPTION OF THE EMBODIMENT(S)

Figure 1:
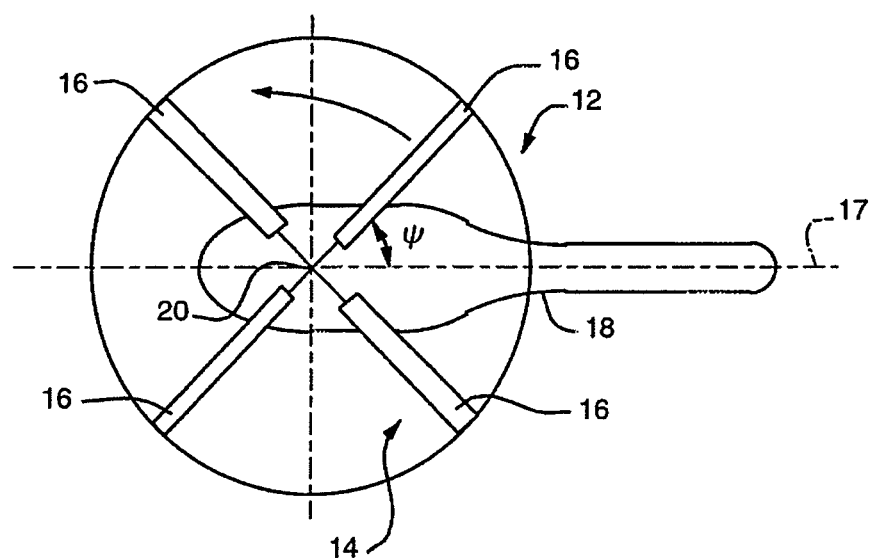
FIG. 1 shows a helicopter that uses the system described herein for measuring and analyzing vibrations.

Referring to FIG. 1, a helicopter 12 is shown having a rotor 14 with a plurality of blades 16. One of the blades 16 may be selected as a reference blade and each of the other blades 16 may be assigned a blade number starting with zero for the reference blade and increasing by one in the direction of rotation. For example, for the four-blade rotor 14 shown in FIG. 1, the blades may be numbered zero through three. Note that the system described herein may work with a different number of blades such as seven. Generally, for a system with B blades, the blades may each have an assigned blade number from zero through B−1. In addition, in some embodiments, the blades 16 may be identified by assigning a unique color to each blade.

Rotation of the blades 16 generates vibrations in the helicopter 12. As described in more detail below, the vibrations may be measured by sensors and then used as inputs to a process that determines adjustments that can be made to the blades 16 to reduce the vibrations. In some embodiments, the adjustments include hub weights, trailing edge tabs, and PCR changes. Other embodiments may also include tip weights of the blades.

The position of the reference blade may be defined by an azimuth angle $\psi$ between the blade itself and a center line 17 of the fuselage 18 of a rotor hub 20 of the helicopter 12. The blades 16 may be equally spaced, so that the position of a blade may be given by the expression $\psi+(b*\alpha)$, where $\alpha=2\psi/b$ is the inter-blade spacing angle and b is the blade index number, which runs from zero through B−1.

As the rotor 14 turns, the angle $\psi$ increases. One complete rotation corresponds with an increase in $\psi$ of $2\pi$ radians or 360°. The rate of rotation of the rotor 14 is usually controlled by an engine governor and thus is substantially constant. Therefore, the azimuth angle is proportional to time, T, and thus may be expressed in terms of T. If the rate of rotation is designated by $\omega$, then $\psi=\omega*T$. In addition, because of the simple relationship between Azimuth angle and T, $\psi$ may also be used as a "dimensionless" measure of time. Motions of the blades 16 and forces of rotor 14, which may normally be thought of as being functions of time, may also be expressed as functions of $\psi$.

Figure 2:
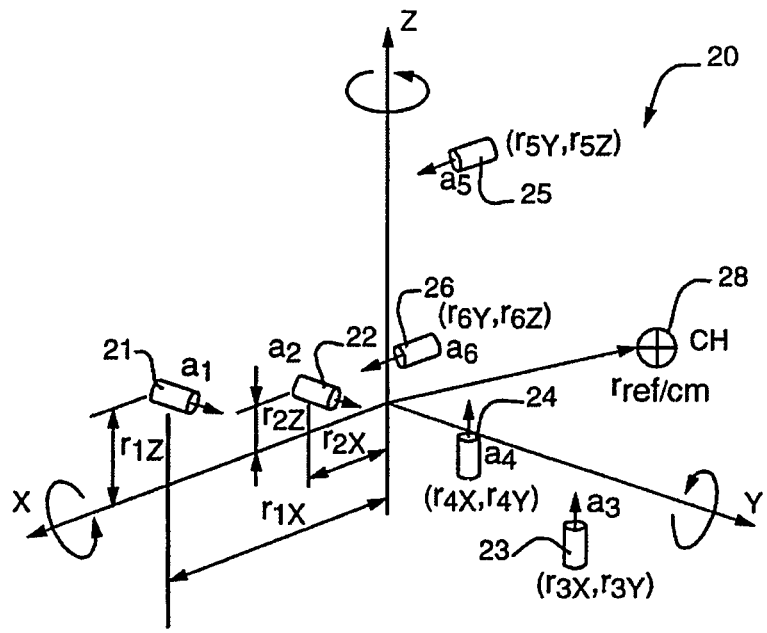
FIG. 2 illustrates a possible placement of accelerometer sensors according to the system described herein.

Referring to FIG. 2, a sensor array 20 includes a plurality of sensors 21-26 that measure vibration of the helicopter 12 near a center of mass at a point 28. The system described herein may be expanded to accommodate additional sensors. In some embodiments, the sensors 21-26 may be arranged in a cube which is mounted so as to allow direct computation of three orthogonal translation and three orthogonal rotational accelerations, as described elsewhere herein. Examples of commercially available sensors that may be used include Part No. CE581M101 Uniaxial accelormeter and/or the Part No. 44-581-000-121 BiAxial Accelormeter, both manufactured by Vibro-Meter Corp.

The sensors 21-24 may be rigidly attached to the helicopter 12, ideally near the center of mass 28 thereof. The x, y, z position of each of the sensors 21-24 with respect to the center of mass 28 may be known, as well as the positive sensing direction of each of the sensors 21-26 and the sensitivities thereof. In addition, the angular position of the rotor 14 may be sensed by one or more tachometers (not shown) that sense the relative position of each of the blades 16 with respect to the center line 17 of the helicopter 12.

The array of sensors 21-26 shown in FIG. 2 utilizes six one degree of freedom accelerometers which may be mounted in pairs. The six uniaxle accelerometers 21-26 may be mounted in convenient positions around the rigid framework of the helicopter 12 such that each of the sensors 21-26 has an axis of sensitivity parallel to one of the reference axes shown in FIG. 2. The location of each of the sensors 21-26 may be specified by first picking a reference point that can be any convenient point on the rigid framework of the helicopter 12 (e.g., a bolt head). If the point that is chosen has known coordinates with respect to the center of mass 28, processing is simplified. From the chosen reference point, which has a reference coordinate system that is parallel to the global coordinate system of the helicopter 12, the cartesian coordinates of the location of each of the sensor 21-26 may be determined. The coordinates may be represented by $r_{ab}$, where the "a" denotes the number of the sensor and the "b" denotes the component axis thereof.

Figure 3:
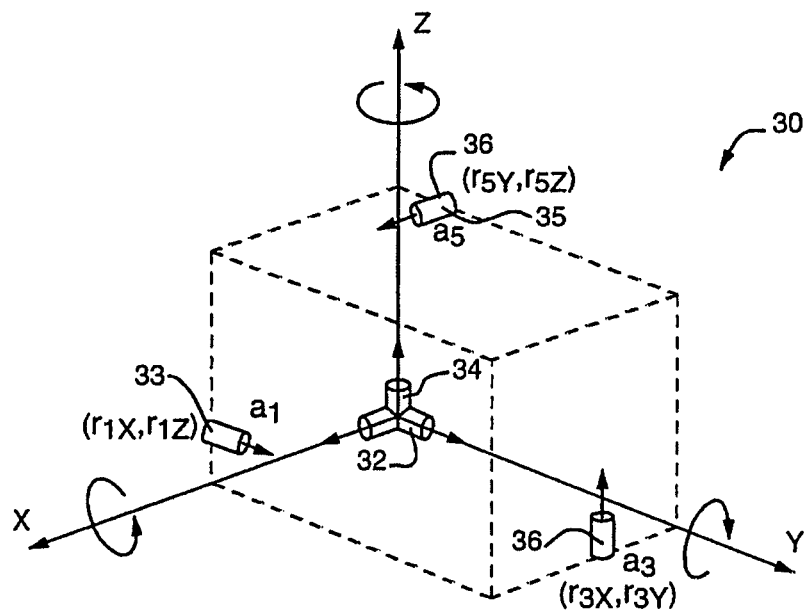
FIG. 3 illustrates an alternative possible placement of sensors according to the system described herein.

Referring to FIG. 3, another embodiment of a sensor array 30 includes a single triaxle accelerometer 32 and three one degree of freedom accelerometers 33-35. The array 30 may use the location of the triaxle accelerometer 32 as a reference point. The output of the triaxle accelerometer 32 may be sufficient to determine the translational acceleration vector of a reference point. Note the array 30 requires fewer sensor locations than the embodiment of FIG. 2. The locations of the three uniaxle accelerometers 33-35 may be determined in a manner somewhat similar to that described above in connection with FIG. 2. Note that the sensor array 20 or the sensor array 30 may be positioned on a single frame to form a six degree of freedom accelerometer and that the frame may be attached to the helicopter 12 as a single entity.

For a system utilizing either the array 20 of FIG. 2 or the array 30 of FIG. 3, the magnitude of the accelerometer vectors, as measured by the accelerometers, are given as a $a_1$, $a_2$, $a_3$, $a_4$, $a_5$, and $a_6$. The reference coordinate axes may be parallel to the mass center line coordinate axes. The position vector from the reference point to the center of mass 28 may be given by $r_{ref/cm}$ with components $x_{ref/cm}$, $y_{ref/cm}$ and $z_{ref/cm}$, measured from the reference point to the center mass 28. Note also that the array 20 and/or the array 30 may be part of a portable system that is placed in the helicopter 12 as needed in connection with obtaining data for analysis.

Figure 4:
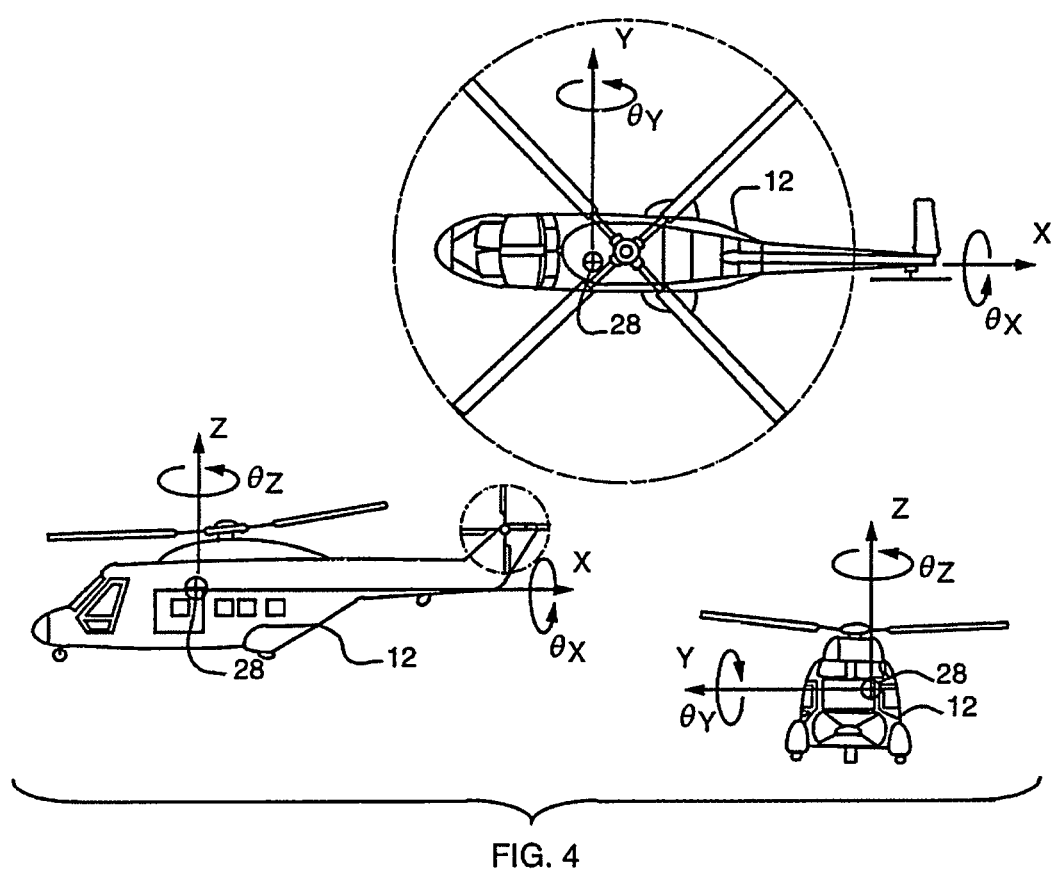
FIG. 4 illustrates different motions detected by the sensors of FIG. 2 and FIG. 3 according to the system described herein.

Referring to FIG. 4, the helicopter 12 is shown from three different positions where the axes of acceleration and the x, y, z and the corresponding rotational accelerations are shown from the center of mass point 28.

Note that the measurements from the sensors may be combined to provide measurement signals of "virtual sensors", which represent vibration values that are desirable to measure and correct for. For example, it may be desirable to have a virtual sensor for the pilot/co-pilot vertical vibrations, which will be determined by, for example, adding the signals from a pair of sensors having vertical axes of orientation near the positions of the pilot and copilot. Similarly, it may be desirable to have a cabin roll virtual sensor, which is determined by taking the difference of the pair of sensors used to determine pilot and copilot vertical vibrations. In one embodiment, the virtual sensors that are measured and processed include pilot/co-pilot vertical, cabin vertical, cabin roll, pilot/co-pilot lateral, cabin lateral, and cabin longitudinal. Note that the pilot/co-pilot lateral virtual sensor may be different from the cabin lateral virtual sensor because the cabin space may move laterally relative to the pilot/co-pilot space in some instances. For the discussion that follows, it is assumed that the sensor inputs that are being processed are the six sensor inputs (virtual sensors) listed above. However, it will be appreciated by one of ordinary skill in the art that different sensors (real and/or virtual) may be used to provide the system described herein.

Figure 5:
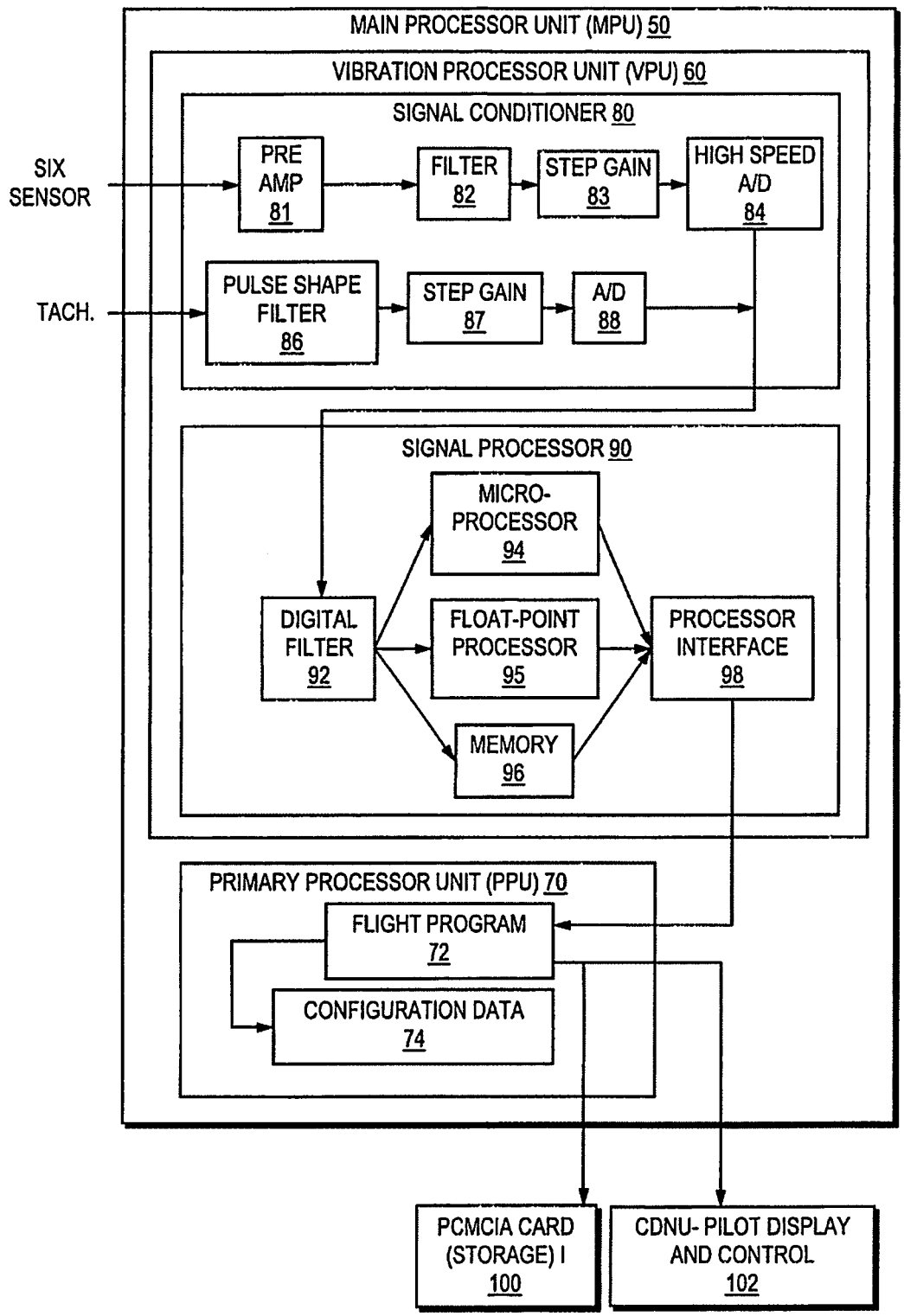
FIG. 5 illustrates processing of accelerometer signals according to the system described herein.

Referring to FIG. 5, data from the six sensors and data from the tachometer(s), which measures the angular displacement of the rotor 14, may be input to a main processor unit 50 which calculates vibrations of the helicopter 12. The main processor unit 50 includes a vibration processor unit 60 and a primary processor unit 70 which are interconnected in a conventional manner. The primary processor unit 70 includes a flight program unit 72 and configuration data unit 74, which are described in more detail herein. The vibration processor unit 60 may be in the same location or a different location than the primary processor unit 70. Similarly, at least some portion(s) of the main processor unit 50 may be fixedly installed in the helicopter 12. Alternatively, the entirety of the main processor unit 50 may be a portable device that is used as needed in connection with analyzing vibrations.

The vibration processor unit 60 includes a signal conditioner 80 and a signal processor 90 connected thereto. The signal conditioner 80 performs initial processing on the six sensor signals and the tachometer signal. The signal processor 90 processes the output of the signal conditioner 80 to provide calculations of the vibrations, as described elsewhere herein.

The signal conditioner 80 includes six pre-amplifiers 81 (one for each of the sensors) for pre-amplifying data input to the signal conditioner 80. Alternatively, the pre-amplifier 81 may be a single pre-amplifier with six channels, or some other arrangement capable of providing pre-amplification of the six sensor signals.

The output of the pre-amplifier 81 is provided to a filter 82, which filters out noise from the signals. In some embodiments, the filter 82 is a low pass filter. The output of the filter 82 is provided to a step gain 83, which adjust the gain of the signals as appropriate for input to a high speed A/D converter 84. The step gain 83 and the high speed A/D converter 84 cooperate to provide an efficient signal range for the processing described herein.

The tachometer signal (or multiple tachometer signals, depending upon the specific implementation) are applied to a pulse shape filter 86 which buffers and provides a low pass filtering of the signal(s) from the tachometer. The output of the pulse shape filter 86 is provided to a step gain 87 and the output of the step gain 87 is provided to an A/D converter 88. As with the sensor signals, the step gain 87 and the A/D converter 88 cooperate to provide an efficient range of signal. The output of the A/D converter 88 and the output of the high speed A/D converter 84 are combined to provide the digital signal output of the signal conditioner 80. Thus, the output of the signal conditioner 80 is the sampled sensor signals and sampled tachometer signal in digital form.

The signal processor 90 receives the output from the signal conditioner 80. The signal processor 90 includes a digital filter 92 that filters the incoming data. The output of the digital filter 92 is provided to a microprocessor 94, a floating point processor 95, and a memory 96, which are arranged in a conventional manner to provide the functionality described herein. The output of the microprocessor 94, and the floating point processor 95, and the memory 96 are provided to a processor interface 98.

The signal processor 90 performs a Fast Fourier transform (FFT) on the input provided thereto from the signal conditioner 80. The FFT converts the time domain data from the six sensors to corresponding Fourier coefficients at a selectable number of harmonics of the 1/rev fundamental. The rotation signal from the tachometer is used to determine amplitude and phase of the fundamental frequencies, which are multiples of the rotation rate of the blades 16.

The output of the signal processor 90 is provided to the primary processor unit 70, which is described in more detail elsewhere herein. The output of the signal processor 90 may also be provided to a storage card 100 and may be displayed to the pilot during flight (or on the ground) with a pilot display and control unit 102.

The sensor data that is collected and provided to the storage card 100 and/or the pilot display and control unit 102 may be used to determine appropriate helicopter blade adjustments to the hub weights, PCR's, and blade tabs (and possibly blade tip weights) to reduce vibration of the helicopter. The algorithm for determining the adjustments may be run either on the pilot display and control unit 102 or may be run using a conventional processor (computer) that is not fixedly installed in the helicopter 12 and/or is not used at all in connection with the helicopter 12. In any case, the algorithm uses the collected sensor data to determine blade adjustments for reducing vibrations.

The sensor data may be collected under different flight conditions, known as "regimes", so that the algorithm for determining blade adjustments that reduce vibrations does so for all regimes and/or is optimized to reduce vibrations for a specific subset of regimes. The regimes may include, for example, the helicopter being on the ground, hovering, 90 knots, 120 knots, and 150 knots. During the data collection process, the pilot may indicate that the helicopter is in a particular regime by pressing a button or otherwise providing appropriate input to the system by, for example, pressing a button on the pilot display and control unit 102. Alternatively, the system may determine when the aircraft is in a particular regime and initiate data collection automatically. Thus, there may be vibration data for each of the sensors (virtual sensors) collected at each of the regimes.

Figure 6:
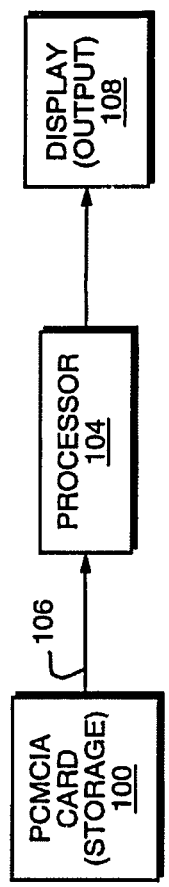
FIG. 6 illustrates a processor for analyzing vibration data according to the system described herein.

Referring to FIG. 6, the storage card 100 is shown being coupled to a processor 104 via a connection 106 therebetween. Collected data may be provided to the processor 104 which determines adjustment information for the blades 16 as described herein. The adjustment information may be provided by the processor 104 to an output, such as a display 108, so that a user, such as a helicopter maintainer, can view the information to determine how to adjust the blades 16. The processor 104 may be implemented by any one of a variety of off-the-shelf computing systems capable of providing the functionality described herein.

A system for indicating blade adjustments to decrease vibrations may include empirical data that indicates the effect of each adjustment. That is, there may be empirical data that provides the change in the vibration caused by each type of adjustment. For example, there may be data that shows that at a particular regime, for a particular sensor (virtual sensor), adjusting the tabs of a blade a particular unit amount effects the vibration a particular amount. The calculations and analysis may be performed in the frequency domain because in the frequency domain it is possible to assume a linear relationship between the adjustments and the effects the adjustments have on vibration in the frequency.

Fourier coefficients (amplitude and phase) of the incremental accelerations caused by unit adjustments of the reference blade, (e.g., a 1 degree deflection of a tab, a pitch link adjustment which causes a 1 degree change in blade angle of attack, etc.) are also used. This data may be obtained from flight test data using the system described herein by systematically making adjustments and solving for the Fourier coefficients or performing an analysis and using the data that is specific to each particular helicopter configuration and operating condition. From the data (which pertains to unit adjustments applied to the reference blade), acceleration caused by similar adjustments to other blades may be computed. Based upon a dynamic model of the rotor system, a particular set of adjustments which most nearly negates the measured acceleration (thereby minimizing vibration) is computed.

What will be described in following paragraphs may be characterized as a rotor track and balance (RTB) technique that can be used to output a set of "optimal" blade adjustments used to bring an aircraft within desired vibration limits. In one embodiment, the RTB technique may determine the set of adjustments based on one of two modes or solution strategies. The first solution strategy may be referred to as minimum vibration (MV) and the second solution strategy may be referred to as minimum adjustment (MA). Various aspects of the foregoing solution strategies and RTB technique, as well as more generally various examples of systems and techniques using analysis of vibrations in connection with analyzing and/or adjusting rotating components of helicopters or other aircraft, are described, for example, in U.S. Pat. No. 6,567,757, May 20, 2003, Reducing Vibration Using QR Decomposition and Unconstrained Optimization, Bechhoefer et al, (the '757 patent); U.S. Pat. No. 6,574,572, Jun. 3, 2003, Reducing Vibration Using QR Decomposition and Constrained Optimization, Bechhoefer, (the '572 patent); and U.S. Pat. No. 7,512,463, Mar. 31, 2009, Reducing Vibration Using QR Decomposition and Unconstrained Optimization for a Multi-Rotor Aircraft, Bechhoefer (the '463 patent), U.S. Pat. No. 6,950,763 (the '763 patent) and U.S. Pat. No. 7,272, 513 (the '513 patent), both to Bechhoefer and entitled "Optimal Shaft Balance Using Integer Programming to Handle Discrete Adjustment," all of which are incorporated by reference herein, and also in the technical paper "IMD HUMS Rotor Track and Balance Techniques", Bechhoefer et al., Aerospace Conference 2003 Proceedings, 2003 IEEE, Volume 7, Mar. 8-15, 2003 Page(s): 3205-3211, ISBN 0-7803-7651-X/03, which is incorporated by reference herein.

Additionally, what will also be described in following paragraphs are techniques that may be used in automatically selecting various inputs to the RTB technique. In one embodiment, the RTB technique may be a function which takes input parameters in connection with producing an output set of adjustments that may be applied to the blades. In one embodiment, the RTB technique may have inputs including the following: which one or more types of adjustments to use (e.g., which one or more of the following to use: weights, PCR, inner tabs, outer tabs), which sensor data to use (e.g., vibration and/or track data), and which solution strategy (e.g, MV or MA) to use. Inner tabs and outer tabs may be more generally referred to as TABs at various positions on a blade with respect to the center hub. Typically, a blade may have one or two tabs. In one embodiment in which the aircraft, for example, is a helicopter, a first type of helicopter may have a single blade including a single tab. A second type of helicopter may have the single blade include two tabs which may be referred to as an inner tab and an outer tab. The adjustment types included in a particular embodiment may vary with the possible types of adjustments corresponding to those of the particular aircraft.

In connection with track data, the sensor data may include track splits. All the blades of a rotor should ideally follow the same track. However, blades (e.g., worn blades) may change track causing increased vibration levels. As known in the art, blade track can be estimated, for example, either by measuring vertical acceleration, or by using a camera measuring the distance between each blade and the airframe. Correction, such as to minimize track split or differential between tracks of rotating blades, may be done by adjusting the length of the blade pitch links (such as by adjusting PCRs), or by bending tabs on the blades.

Given a current set of sensor data for an existing system, techniques are described herein for automatically selecting the appropriate input parameters to use when performing the RTB technique. Such techniques evaluate the current sensor data and automatically make a "best" selection of the input parameters for use with the RTB technique. It will be appreciated by those skilled in the art that the techniques described herein for selection of the input parameters for the RTB technique may be more generally applied for use in connection with other techniques having a different number and/or type of input parameters in accordance with the underlying technique performed.

It should be noted that use of the MV or MA option may be desirable for different sets of current conditions including current sensor data. For example, The MA option may be performed when an aircraft is considered not largely out of balance. In contrast, the MV option may be performed when an aircraft is considered largely out of balance or when other circumstances indicate that a more optimal or extensive balancing is needed. As such, whether to use MV or MA as a solution strategy may vary with a current state of vibration of the rotating blades as may be indicated by one or more sensor readings. A primary difference between MV and MA is the number of vibration adjustment orders (e.g., also referred to as harmonic orders or shaft orders) for which each of the solution strategies solves. The number of vibration adjustment orders may be represented as the "(number of blades–1)/2", rounded upwards, where "number of blades" refers to the number of blades of the aircraft. With MV, all adjustment orders are optimized. Additionally, for each selected adjustment type other than weights, X blades are adjusted where X="number of blades–1". It should be noted that more generally, with MV, X blades are adjusted for each selected adjustment type which may be characterized as affecting the "flapping motion" of the blade or blade flapping. As known in the art, blade flapping may be characterized as the up and down movement of a rotor blade. Rotor systems are subjected to dissymmetry of lift in forward flight. When hovering, the lift is equal across the entire rotor disk. However, as the helicopter gains air speed, the advancing blade develops greater lift because of the increased airspeed and the retreating blade produces less lift. Dissymmetry of lift is compensated for by blade flapping. Because of the increased airspeed (and corresponding lift increase) on the advancing blade, it flaps upward and decreases the angle of attack. Decreasing speed and lift on the retreating blade causes it to flap downward and increases the angle of attack. The combination of decreased angle of attack on the advancing blade and increased angle of attack on the retreating blade through blade flapping action tends to equalize the lift over the two halves of the rotor disc. In connection with both MV and MA, any weight adjustments are made with respect to two blades.

With track data selected in combination with vibration data, one embodiment of MV reduces the vibration at adjustment order 1 and reduces track (e.g., track split) at the remaining adjustment orders. Without track data selected for use, MV reduces the vibration at all adjustment orders. One embodiment of the MA algorithm may be characterized as a vibration-only solution where, if track data is selected, track data is used to accept and rank solution sets. The foregoing solution sets may be determined based on only vibration data minimization with a constraint (as described in more detail elsewhere herein). The MA first attempts to reduce the largest vibration adjustment order with two blades across all adjustment types selected. If the adjustment does not adversely affect the remaining vibration and track shaft orders, the adjustment is accepted. If track data is selected, track thresholds may be used to accept or reject adjustment sets. However, use of track data is not required. If the adjustment does adversely affect the remaining vibration and track shaft orders, the adjustment is rejected and the next highest vibration adjustment order is added to the solution set and its adverse affects are checked. This cycle may be repeated until either all adjustment orders are considered, or until a solution is found which satisfies specified thresholds. It should be noted that an embodiment in accordance with techniques herein may perform a variation of what is described herein. For example, an embodiment of the MA algorithm may choose to optimize on a particular shaft order, such as shaft order 1, and only perform one per rev, 2 blade adjustment.

As a further variation, an embodiment of the RTB technique may allow for specification of track-only data. In this case, the MA solution strategy may not be operable as a valid option in combination with a track-only data selection. With the MV solution strategy and track-only, an embodiment may optimize with respect to track data across all adjustment orders (e.g., where the number of adjustment orders is "(number of blades−1)/2", rounded upwards.)

To simplify a description of the procedure involved with the RTB technique, an example will be discussed which considers only one type of rotor blade adjustment, the trailing edge tab settings, and only one flight condition, which need not be specified. The acceleration generated at the rotor hub 20 by a one degree downward deflection of the trailing edge tab on a reference blade might be denoted by the function $T(\psi)$. (Note that $T(\psi)$ may be a vector-valued function having three components $T_{x(\psi)}$, $T_{y(\psi)}$ and $T_{z(\psi)}$, denoting accelerations along each of three orthogonal directions.) The acceleration generated by a similar 1 degree deflection of the tab on blade b is then $T(\psi + b\Delta)$, and the acceleration caused by a deflection in the amount $a_b$ is $$a_b T(\psi + b\Delta) \quad \text{EQUATION 1}$$

Finally, the acceleration generated by deflections in the amounts provided on the blades $b = 0, 1 \ldots B-1$, which may be denoted by $a_{tab}$, is $$a_{tab} = \sum_{b=0}^{B-1} a_b T(\psi + b\Delta) \quad \text{EQUATION 2}$$

In steady flight, $T(\psi)$ is a periodic function, as all forces generated by the rotor repeat themselves at the interval of rotation of the rotor. Therefore, $T(\psi)$ can be expressed as a Fourier series:

$$T(\psi) = \sum_n T_n e^{-in\psi} \quad \text{EQUATION 3}$$

In the complex exponential form of the series shown above, the index n is summed over all integers, positive and negative. From hereon in the detailed description where no summation limits are shown, such an indefinite summation is intended.

Generally speaking, the permitted blade adjustments generate pronounced forces and moments at the rotor rotation rate, and have much less effect at higher frequencies. For the complex Fourier series shown above, this means that the components n such that n=+/−1 are the largest in magnitude, and component indices greater than 1 or less than −1 are much smaller. Using this Fourier series for a unit deflection of the tab on the reference blade, it can be shown that the acceleration $a_{tab}$ generated by arbitrary tab deflections on all blades is:

$$a_{tab} = \sum_n A_n T_n e^{-in\psi} \quad \text{EQUATION 4}$$

In the equation above, the set of quantities $\{A_n\}$ are the discrete Fourier transform of the set of tab deflections $\{a_b; b=0, 1 \ldots B-1\}$:

$$A_n = \sum_{b=0}^{B-1} a_b e^{-inb} \quad \text{EQUATION 5}$$

The $A_n$ are generally complex numbers. They form an infinite periodic sequence, the period being the number of blades, B. Because the tab settings $a_b$ are real numbers, the $A_n$ have the following property (*denotes the complex conjugate):

$$A_{B-n} = A_n^* \quad \text{EQUATION 6}$$

Combining this property with the periodicity of the sequence, it can be shown that $A_0$ is a real number, as is $A_{B/2}$, if B is even.

As can be seen in the equation for $a_{tab}$, the $A_n$'s form a frequency mask. If a particular $A_n$ is zero, then the corresponding frequency is not present in the Fourier series for the incremental acceleration caused by the tab settings, $a_b$. For example, if on a four blade rotor the trailing edge tabs on each pair of opposing blades are given the same setting, the associated blade forces and motions substantially replicate themselves twice each revolution, so that no net forces are generated at the rotor rotation rate.

The acceleration measured on an untrimmed rotor (the vibration which is to be minimized) is also a (vector-valued) periodic function, and so can be expressed as a complex Fourier series:

$$a = \sum_n a_n e^{-in\psi} \quad \text{EQUATION 7}$$

This series is a mathematical representation of the data provided by the signal processor 90. Including now the additional acceleration caused by the tab deflections, the total acceleration can be calculated as:

$$a + a_{tab} = \sum_n (a_n + A_n T_n) e^{-in\psi} \quad \text{EQUATION 8}$$

The vibrations are thus analyzed in the frequency domain, allowing determination of many orders of effects.

As described herein, the RTB technique, optimizes the adjustments such as weight (WTS), pitch control rod setting (PCR) and blade tab setting (TAB) on a helicopter to reduce vibration and/or track at adjustment orders 1 through N (where N is the number of adjustment orders which equals the number of blades over 2 (e.g. divided by 2) and then rounded downwards. The algorithm can optimize the vibration data only if desired. A vibration only solution will reduce vibration at all adjustment orders. The result of lower vibration at all adjustment orders typically results in smaller track. Lower vibrations levels will reduce damage/wear to the aircraft components and reduce fatigue to the crew. The RTB technique solves a series of simultaneous equations for the general problem in the frequency domain (i.e. Fourier transformed) for each adjustment order, over all sensors and flight regimes and is represented by the following equation for analyzing the vibrations as well as the effect of adjustments to the blades:

$$v = u + X \cdot A \quad \text{EQUATION 9}$$

where:
v represents the vibrations after adjustment,
u represents the vibration before adjustment,
a represents the adjustment, and
X represents coefficient of vibration data that corresponds to effects on vibration caused by the adjustments.

All of the quantities are multi-valued and thus are represented as matrices. The values for X are determined in a manner consistent with that described above for empirically determining the effect of adjustments on acceleration (vibration). It also generally be noted that capital letters such as used in connection with EQUATION 9 and others herein, are used in connection with the Fourier domain and a term in lowercase for the time domain (e.g., $a=F^{-1}A$, $F^{-1}$ representing an inverse DFT (Discrete Fourier Transform) matrix as described elsewhere herein for conversions between the frequency and time domains).

The matrices u and v may be "k by one" (e.g., k×1) matrices where k equals the number of sensors of interest (i.e., the number that are analyzed) multiplied by the number of regimes. If there are three adjustments (i.e., tabs, PCR's and hub weights), then A is a three by one matrix representing the Fourier adjustment for the given shaft order and X is a k by three matrix. Note that, if it is desirable to include tracking data, the data can be added to the u and v arrays and added to the X array in the same way that a new regime would be added. In that case, the calculations discussed herein for minimizing vibrations would, in fact, be minimizing and performing calculations on the combination of vibrations and track data.

It should be noted that changes in blade track (blade height) caused by changes in the blade balance settings may be similarly modeled by the following equation:

$$y = z - XA \qquad \text{EQUATION 10}$$

Where
z: Track before adjustment
y: Track after adjustment
X: Coefficient of track height due to a unit change in an adjustment
A: Desired adjustments In the foregoing, all elements of the track model equation are Discrete Fourier Transform (DFT) coefficients. In connection with p (the number of shaft orders), for p<N/2 the DFT coefficients are complex entities, whereas if p=N/2, the DFT coefficients are real. It should be noted that the rotor head has an even number of blades for p=N/2 to b real. Representing the track data as DFT coefficients allows the equation matrices to contain both vibration and track data.

The RTB technique may represent sensor data, such as may be used for the input parameter representing a current set of conditions, as linear combinations of measured vibrations such as using virtual sensors. Each virtual sensor is defined by assigning values to a vector, or template, t, consisting of a real element for each physical sensor. The 'output' or value of the virtual sensor is computed by forming the vector product t*u having a vector length k (number of sensors) and u is the measured data length k.

As an example, for a 4 blade rotor, we can solve for N−1, or 3, shaft orders, where the optimization is conducted (N−1)/2 times (e.g. 2). The answer, A, used to build the Fourier adjustment, can be obtained as follows: For 4 blades, we solve shaft orders 1 and 3 together (e.g. 3 is the conjugate of 1) and get the A matrix having the following form for an embodiment having weights, PCRs and tabs (Note: tabi=inner tab adjustment; tabo=outer tab adjustment; pcr=pct adjustment; wgt=wgt adjustment; conj(X)=conjugate of X):

| [wgt | pcr | tabi | tabo] |
|---|---|---|---|
| [0 | 0 | 0 | 0 ] |
| [conj(wgt) | conj(pcr) | conj(tabi) | conj(tabo)] |

Then we can solve for shaft order 2 having an A matrix of the following form:

| [wgt | pcr | tabi | tabo] |
|---|---|---|---|
| [wgt2 | pcr2 | tabi2 | tab3 ] |
| [conj(wgt) | conj(pcr) | conj(tabi) | conj(tabo)] |

The collection of templates defined can be combined into a matrix, say T, for calculating all virtual sensors where T has $N_{vs}$ (number of virtual sensors) rows and $N_s$ (number of sensors) columns. The virtual sensor transform matrix is used for all shaft orders. Equations for the changes in 'virtual' vibration caused by changes in rotor adjustments are formed by multiplying each vibration vector by the appropriate template matrix, as shown below.

$$Tv = Tu + TXA \qquad \text{EQUATION 11}$$

It should be noted that u, v, X, and a may be as described above in connection with EQUATION 9.

In one embodiment in accordance with techniques herein, the RTB technique can be performed using three different sets of data—either vibration and track data, all vibration data, or all track data. When both vibration and track are used, the MV solution uses vibration data for adjustment order one and track data for the remaining adjustment orders. The solution model then contains both vibration and track data. For adjustment order one the equation below is used:

$$v_p = u_p - Xvib_p A_p \qquad \text{EQUATION 12}$$

where v is the vibration after the adjustments, u is the vibration before adjustments, Xvib are the vibration influence coefficients, A is the adjustments transformed to the shaft order domain and p is the shaft order. For all adjustment orders>1, the following track equation is used by the MV solution strategy when not in the vibration-only mode (e.g., vibration and track data are used):

$$y_p = z_p - X\text{track}\, A \qquad \text{EQUATION 13}$$

Where y is the vibration after the adjustments, z is the vibration before adjustments, Xtrack are the track influence coefficients, A is the adjustments transformed to the shaft order domain and p is the shaft order.

When the RTB technique MV solution strategy is selected to determine a solution using just vibration data, all virtual sensor data is minimized at all adjustment orders (e.g., in accordance with EQUATION 12 for all adjustment orders). Although there is no direct link to the track data in performing and all vibration solution, track may also be reduced by reducing vibration across the higher harmonics or adjustment orders (e.g. vibration due to flapping motion encountered in forward flight). Reducing vibration higher harmonics tends to flatten track. When the MV solution strategy is selected using only track data, processing is performed to minimize track data with respect to all adjustment orders.

One embodiment of the MA solution strategy as described herein may use only vibration data for minimization goals and may optionally use track data for ranking possible alternative adjustment solutions if track is also specified in combination with vibration as an option. Thus, the MA solution strategy (rather than MV) uses EQUATION 12 to minimize vibration. Initially, MA uses EQUATION 12 with respect to the largest vibration adjustment order, and, then with respect to additional vibration orders as they may be added.

As will be described in more detail below, selecting a set of adjustments for both MV and MA may be subject to a constraint such that the vibration after adjustment is less than some threshold, where the threshold can be the error of the adjustments (e.g., therefore the vibration after adjustment is within the error of the adjustments).

With reference back to EQUATION 9, the goal is to solve for A so that v represents a relatively low amount of vibration (or, as discussed above, a combination of vibration and track data, which will be hereinafter referred to as vibration for simplicity). The amount of vibration associated with v is $\|v\|$ (the norm of the matrix v). Ideally, it is desirable to drive $\|v\|$ to zero (i.e., have all entries of the matrix equal zero). However, doing so in many instances results in a somewhat large (and thus risky) set of suggested adjustments. In addition, since there may be errors inherent in the system due to errors in adjustment, measurement, calculating the effects of adjustments, etc., then it is not necessary to drive $\|v\|$ to zero. Instead, it is sufficient to cause $\|v\|$ to be less than a predetermined value, $\delta$. In some embodiments, $\delta$ may be set to the sum of all of the expected values of errors associated with an adjustment. Note that, although it may not be possible to know with certainty where errors are specifically occurring (e.g., the measurement of coefficients or the adjustments themselves), it is still possible to estimate the total expected error. Note further that different sets of adjustments that fall within the total expected error are indistinguishable in terms of predicting their ability to improve the vibration characteristics of the aircraft.

The foregoing use of the predetermined value $\delta$ may also be characterized as a constraint such that the vibration after adjustment is less than some error value, $\delta$, where $$\delta = \sqrt{\text{trace}\{X^T \cdot \text{AdjustError} \cdot X\}} \qquad \text{EQUATION 14}$$

The Adjust Error is the estimated variance in a given adjustment type and number. Note that $\delta$ in EQUATION 14 is the square root of the sum of variances, projected onto the range space of X. Selection of $\delta$ as in EQUATION 14 ensures that the norm of the vibration after an adjustment is less than one standard deviation of system variance. This forces the deviations of an adjustment to be close to zero vibration. It should be noted that the foregoing constraint or error threshold may be used in connection with an embodiment when optimizing with respect to vibration and/or track.

With reference again to EQUATION 9, the following solves for the adjustment, a, using the constraint that $\|v\| < \delta$. QR decomposition is a known technique that may be used to solve matrix equations. In this instance, matrixes Q and R are chosen so that Q·R equals X. In addition, QR decomposition provides that Q is such that $Q^T \cdot Q$ equals I, the identity matrix. Thus, $$v = u + Q \cdot R \cdot A \qquad \text{EQUATION 15}$$

multiplying through by $Q^T$ yields:

$$Q^T \cdot v = Q^T \cdot u + R \cdot A \qquad \text{EQUATION 16}$$

since $\|v\| < \delta$ and multiplying v by $Q^T$ simply scales the norm of v, then:

$$\|Q^T \cdot u + R \cdot A\| < \delta \text{ (or a different } \delta \text{, scaled by } \|Q^T\|) \qquad \text{EQUATION 17}$$

How the equation set forth above may be used to solve for A is discussed in more detail below.

In the course of solving for A, it is possible to find a solution in a way that minimizes vibrations at the fundamental frequency and/or the harmonics by performing the computations set forth above using a subset of the matrices corresponding to the frequencies of interest. However, because the adjustments affect vibrations at all of the frequencies, in some instances it is possible that an adjustment will decrease vibrations at one frequency while increasing vibrations at another frequency. On the other hand, there is a relationship between the vibrations at various frequencies such that optimizing on the shaft order p provides for simultaneous adjustment on any frequency corresponding to the following:

$$(N \times B) +/- p \qquad \text{EQUATION 18}$$

where N is an integer and B corresponds to the number of blades. Thus, optimizing on the first order frequency (i.e., p=1) for a seven blade helicopter also affects the 6th and 8th orders (N=1), the 13th and 15th orders (N=2), etc. In other words, $A_{F1} = A_{F2}$ in instances where F1 and F2 obey the relationship set forth above. Note that the even in instances where F1 and F2 meet the criteria set forth above, $X_{F1}$ does not necessarily equal $X_{F2}$.

Note that, for embodiments where the blade adjustments or adjustment options include hub weights, tabs, and PCRs, it is necessary to provide a mechanism to correlate the various values. Otherwise, it is difficult to determine how to compare, for example, one ounce of weight for a hub weight adjustment with one degree of tab deflection. In embodiments disclosed herein, adjustment values used, for example, in the X array and the A array, are normalized according to a maximum value for each adjustment. Thus, if the maximum hub weight adjustment is, for example, twenty ounces, then one ounce would be represented as 0.05. Similar normalization may be used for the PCR adjustments and the tab deflection adjustments (and possibly blade tip weight adjustments). Normalizing the adjustment values allows for computations that compare and/or combine the values. In addition, normalizing by one over the maximum allowable amount for each of the types of adjustment provides a weighting that compensates values for each type of adjustment according to the percent of the allowable range represented by a particular adjustment.

In one embodiment, normalization occurs by computing a weight norm matrix:

$$A^T \cdot E \cdot A \qquad \text{EQUATION 19}$$

where E is a diagonal matrix where the diagonal elements equal the inverse of the maximum amount for each physical adjustment. Thus, if the maximum PCR adjustment is twenty clicks, the diagonal element of E corresponding to the PCR adjustment is $\frac{1}{20}$. That way, any PCR values in the A matrix are normalized according to the maximum PCT adjustment. Hub weight and tab adjustments are similarly normalized, thus making it possible to correlate the risks (i.e., the amount of change) associated with different types of adjustments. For example, for purposes of risk assessment, a weight adjustment that is one half of the maximum allowable weight adjustment is equivalent to a tab adjustment that is one half of the maximum allowable tab adjustment. Note that it is possible to normalize using values that are different from the maximum range of each of the adjustments.

The system discussed herein minimizes the weight norm matrix, $A^T \cdot E \cdot A$, subject to the constraint discussed above of $\|Q^T \cdot u + R \cdot A\| < \delta$. Minimization of $A^T \cdot E \cdot A$ may be performed using any one of a variety of conventional techniques, such as the Newton-Raphson technique.

Once an appropriate value for A is found, it is necessary to convert the calculated adjustment, which is expressed in the A matrix in the Fourier domain, back to a real adjustment. This may be performed by multiplying the A matrix by an inverse DFT matrix, where each of the rows of the inverse DFT matrix correspond to the blade to be adjusted and each of the columns corresponds to the adjustment type. Note that for a system with B blades, there will be B−1 rows since only B−1 blades (at the most) are adjusted. Note further that, for weight adjustments, only two blades at most need be adjusted.

The inverse DFT matrix is a B×B matrix. Elements of the inverse DFT matrix are given by:

$$\frac{1}{B} e^{i 2\pi pb/B}, b, p = 1 \ldots B \qquad \text{EQUATION 20}$$

where p and b indicate the position in the inverse DFT matrix.

In other embodiments, a different value for δ may be chosen. Note that it is possible to trade off values for δ and risk. That is, increasing δ would tend to decrease the risk by increasing the solution space for acceptable adjustments. Similarly, decreasing δ would tend to increase the risk.

As described herein, the default MV algorithm may optimize on shaft order vibration 1 through N/2 (where N is the number of blades), rounded down. For example, with respect to a CH-53E helicopter by Sikorsky with 7 blades when considering all types of adjustments (e.g., PCR, tab as a single tab per blade, and weights), RTB may determine that adjustment orders 1 through 3 are optimized which results in N-1 adjustments (meaning that N-1 blades are adjusted for each adjustment type of PCR, Tabs, etc., N=number of blades) for PCR and tabs (e.g. 6 PCR, 6 Tab) and 2 weight adjustments. The MA algorithm optimizes the shaft order with the largest magnitude vibration. In the exemplary case of the CH-53E, this may normally be shaft order 1, and RTB may determine an adjustment involving 2 weight, 2 PCR and 2 Tab adjustments. As noted earlier, the constraint is a function of the system error (e.g. variance in the adjustments). For this reason, the constraint for the MA algorithm may be smaller than the constraint for the MV algorithm and, in accordance with EQUATION 14 described above, may be represented as:

$$2*\text{error}_{weight} + 2*\text{error}_{per} + 2*\text{error}_{tab} < 2*\text{error}_{weight} +$$
$$6*\text{error}_{per} + 6*\text{error}_{tab} \qquad \text{EQUATION 21}$$

The resulting MA adjustment will be larger (e.g. higher cost/risk, because the solution space is smaller and each adjustment is doing more work) and the vibration for the optimized shaft order will be smaller (again, the solution space is smaller).

Making a subset of adjustments based on optimization of 1 shaft order will affect the vibration level of the shaft orders that were not optimized. The "subset" of adjustments may refer to only making adjustments for a portion of all possible adjustment types as may be selected via RTB optional inputs (as may be the case for MA and MV), and/or performing adjustments for fewer than "number of blades–1" blades for a particular adjustment type (as may be the case for MA such as with PCRs and tabs. In one embodiment, MV always makes "number of blades–1" blade adjustments for PCRs and tabs). Even though adjustments may be made for only a subset of adjustments, RTB may perform processing to optimize across all adjustment types for a shaft order. For example, consider a system with possible adjustment types of PCR, weights, inner tab and outer tab and inputs to RTB indicate only considering 2 particular adjustment types (e.g., PCR and inner tab). RTB performs processing for optimization (such as in accordance with EQUATION 9 with an appropriate constraint) across all adjustment types (e.g., PCR, inner tab, outer tab, and weights) for a shaft order. A solution of adjustments output by RTB may include making adjustments for any combination of one or more of those selected two adjustment types (of PCR and inner tab in this example) and optimization may be performed across all adjustment types for a shaft order. Weights (e.g., hub weights) effect vibration of the 1/rev or first shaft order and not of higher shaft orders.

Real blade changes or adjustments are calculated for an adjustment type across N-1 shaft orders. The real blade adjustment is calculated as:

$$a = F_{i,j}^{-1} A \qquad \text{EQUATION 22}$$

where A is the optimal DFT adjustment (e.g., such as may be determined in accordance with EQUATION 9 and associated constraint of EQUATION 14 as described above), $F_{i,j}$ is a partition of the DFT matrix, and a is the real blade adjustment.

The effect of the real blade adjustment is:

$A = Fa,$ $V = U - XA \qquad \text{EQUATIONS 23A and 23B}$

Unless all N-1 adjustments are made for those adjustment types affected by blade flapping (e.g., for PCRs and tabs), there will be a change to the shaft order vibrations that are not optimized. It should be noted that the partition of the DFT matrix selected for conversion varies depending on the possible solutions considered. Note that in the Fourier or frequency domain, A is a periodic vector and in the time domain, "a" represents the real adjustments. For example, if A for weights is [1 2i], there are 4 possible answers or real blade adjustment values for "a":

| 1 | 0 | 0 | 1 |
| 2 | 2 | 0 | 0 |
| 0 | −1 | −1 | −1 |
| 0 | 0 | −2 | −2 | each of which may be determined by selecting different appropriate portions of the DFT matrix as Fi,j. As a further example, consider adjustments for tabs (inner and outer) and PCRs, with 3 blades, there are 3 choose 4 (e.g., 4) possible combinations. The DFT matrix is 4×4 and, as the partition Fi,j of the DFT matrix, one selects 3 out of the 4 rows/columns thereof in accordance with the "3 choose 4" possible solutions. From the possible sets of real blade adjustments for a given instance of A, one set of real blade adjustments is selected, for example, such as the set of real blade adjustments associated with the smallest DC offset.

The partition may have rows representing shaft order 1 through N-1 and the columns representing the blades which are to be adjusted.

Noting the effect of not performing N-1 adjustments for a particular adjustment type, both MA and MV try to find some subset of all adjustments (e.g., fewer than N-1 blade adjustments for a particular adjustment type) that do not adversely affect the higher shaft order or blade track order. In connection with this, the MA algorithm estimates the vibration for all shaft orders based on all possible combinations of blade adjustments for each adjustment type.

Each blade adjustment excluding weights (hub) has an effect on vibration for each shaft order greater than 1. Most adjustments adversely affect the non-optimized shaft orders, but a few, by chance, reduce vibration. The MA algorithm searches for those few adjustments that are good adjustments. For example, with PCRs for 7 blades, rather than always make 6 blade adjustments, the MA technique attempts to make less than 6 blade adjustments and may first try all possible blade adjustment combinations for 2 blade adjustments. The MA compares each predicted adjustment vibration (for a given blade adjustment combination) for each sensor and regime to a threshold. For example, those adjustments that are below a threshold such as 0.05 ips (inches per second), are then ranked by the sum of squares of the vibration, and the best 7 adjustments (e.g., best 7 blade adjustment combinations) are given to the user. If there is no good adjustment, the algorithm increases the number of adjustments (e.g., number of blades adjusted for a particular adjustment type such as PCR or tab) from 2 to 4, optimizing on the worst two shaft order vibrations. If no good vibrations are found, the algorithm defaults to a full N-1 blade adjustment. This adjustment is identical to the MV when no track data is available. However, when track data is available and vibration and track data are selected for use with RTB, MA and MV differ in that the MV algorithm optimizes the higher shaft orders on Track, while the MA algorithm optimizes vibration on all shaft orders, and sorts by Track.

As described in more detail elsewhere herein, the MA algorithm may also test for acceptable track if track information is available and selected. The MA algorithm is unique in that it may provide a 2-blade adjustment for a particular adjustment type while taking into account other shaft order vibration and track information.

The decision to use MV or MA may be dependent on operation requirements. The following are some aspects that may be considered in connection with selection of MV or MA in one embodiment in accordance with techniques herein. For MV, a solution to balance the aircraft is typically determined in one attempt with N-1 adjustments per adjustment type. For MA, a solution to balance the aircraft in typically determined in one attempt using two adjustments per adjustment type. Note that MA adjustments tend to be larger than MV adjustments and, because there is no optimization on the higher shaft orders, the MV solution tends to result in larger track spread. Both MV and MA can calculate adjustments using all or a subset of adjustment types. Both MV and MA may determine adjustments in one or more modes such as absolute and/or relative. For example, both MV and MA adjustments may be made in a relative mode where adjustment solutions output are specified relative to the current rotor state. Both MV and MA may be used with vibration data collected over a number of regimes automatically or by forced acquisition. The acquired data, such as vibration and/or track data, may be stored on the completion of the flight. The RTB technique may then use the foregoing acquired vibration data to recommend a solution based on all or a subset of those regimes and/or data from several flights. It should be noted that the solution output by RTB generally improves with the number of regimes and/or data sets.

As described herein, the optimization objective function differs for MV and MA. For MV, RTB minimizes all correctable vibration frequencies or shaft orders generated by the rotor head (i.e. One Per, Two Per and Three Per for UH60a). The solution produces N-1 adjustments for PCRs and tabs (i.e. 6 PCRs and 6 tabs for a 7 bladed rotor). The effect of the adjustment on the remaining frequencies is predicted (such as using modeling) and compared to the vibration and/or track thresholds (depending on whether the track option is enabled/selected).

1. If the vibration for any of the non-optimized or remaining frequencies exceeds its threshold, the adjustment set is rejected. A similar comparison may be made for track data (e.g., determine track split) and track thresholds using the candidate adjustment set.
2. If the adjustment is rejected, an adjustment is calculated including the next largest vibration frequency.

Steps 1-2 may be repeated until a solution that satisfies the thresholds is found, or until the algorithm reaches the full set of frequencies as with the MV solution strategy.

In connection with MV, the recommended adjustment or output can be calculated with or without the use of track data. In one embodiment in accordance with techniques herein, MV generated solutions using track data may minimize vibration at shaft order 1 and minimize track at remaining shaft orders. In connection with minimizing track data, a technique such as sum of the squares of the track split over all regimes may be used. In connection with the MA solution strategy, the recommended adjustment or output can be calculated with or without the use of track data. A two-blade MA solution optimizes for vibration for shaft order 1 and calculates a vibration for higher order shafts. The algorithm then thresholds the data and finds an acceptable set of adjustments (e.g. lowest vibration at all shaft orders), estimates track based on the set of adjustments being considered, and determines whether the estimated track data is within an acceptable threshold. If a candidate set of adjustments meets all vibration and track thresholds for the higher shaft orders, the candidate set of adjustments may be ranked with respect to other such candidates. The ranking may be performed using a variety of different techniques. One embodiment may determine the sum of the squared track splits over all regimes. A user or operator may be presented with a list of a selected number of the top ranked one or more adjustment candidates (e.g., those having the smallest such sums). It should be noted that MA solutions tend to have larger track splits than MV solutions. It should also be noted that a primary goal of rotor balancing is to reduce vibration which may not necessarily result in also having minimum track (e.g., minimizing track split).

An embodiment of the MV technique may produce the smallest magnitude adjustments necessary to reach the target vibration. This feature provides an advantage of reducing a number of required function check flights (FCFs). As known in the art, an FCF determines whether aircraft airframe, engine or engines, accessories, and/or equipment is functioning according to established standards while the aircraft operates in its intended environment. With MA, the magnitude of the adjustments tends to be larger than for adjustments produced using MV. Such larger adjustment values may potentially trigger an FCF when in smoothing mode. Note that the ability of a system to smooth rotors using the RTB technique without required a confirming FCF is an important cost savings feature.

In connection with available adjustment sets, MV has multiple adjustment sets available to accommodate not using any one blade in the adjustment set. For example, if a black blade has a problem PCR, there are other possible adjustment solution sets that do not use the black blade. With MA, a limited set of adjustments may be presented. The recommended adjustment set may be ranked based on non-optimized vibration performance if trackerless (e.g., no track data is selected for use) or using tracking data (e.g., track split) if track is selected.

The foregoing describes an embodiment of the RTB technique which may be implemented as a function having one or more input parameters specifying options for use with the RTB technique. As described herein, the options that may be specified may include a selection of which adjustments (e.g., any one or more of PCRs, weights, inner tabs, outer tabs), which sensor data (e.g., vibration and/or track) and which solution strategy (e.g., MV or MA) are used. The options may be selected for use by an operator and proper selection of such options may require extensive knowledge, experience and/or know-how. As such, an operator may easily make inappropriate selections for such options. Defaults may be specified so that the operator may elect to use such defaults rather than make any option selections. However, such defaults may also not be desirable for use in all instances to correct all types of vibration conditions currently existing.

What will now be described are techniques that may be used in connection with automatically selecting one or more options for use with RTB. Such selection may be based on previously acquired sensor data (for actual or virtual sensors)

for one or more regimes. As described herein, the acquired sensor data may include vibration data and also track data. For purposes of simplicity of illustration, a simple example will be taken with respect to vibration data for a single sensor acquired for one or more regimes. In this example, the vibration data for the regimes for the single sensor may be represented as a vector of "M" by 1 (M×1) values where there are M regimes, M being greater than or equal to 1. It will be appreciated by those skilled in the art that the sensor data may more generally include data for a plurality of different N sensors, each at a plurality of different M regimes.

Given the one or more regimes and associated vibration data (or more generally sensor data), the techniques described in following paragraphs describe a system for selecting the "best" options for use with RTB. More specifically, selected are one or more adjustment types (e,g., from all possible adjustment types such as PCRs, weights, inner tabs, and outer tabs), whether to use vibration and/or tracking, and what solution strategy (e.g., MV or MA) to use. As described herein in one embodiment, selection of vibration and/or tracking may have a different affect in connection with processing depending on whether MV or MA is also selected. It should be noted that an evaluation of "best" options for use with RTB may be based on "a priori" information such as previously obtained sensor data and what options were previously determined as appropriate for use when a current state of a system or component with respect to vibration is characterized by such sensor data. The determination as to what options are appropriate or best for a particular set of sensor data may be made by an operator or user having expertise and knowledge to make such evaluation. The foregoing a priori information, which may include previously gathered sensor data and associated selected appropriate options, may be stored in a data store such as a database, file, and the like, known in the art for storing data. A current set of acquired or observed sensor data may be compared to such previously gathered sensor data to evaluate which options are "best". The evaluation may select which options are most appropriate for the current set of sensor data given which options were previously deemed "best" in connection with previously gathered sensor data.

Following paragraphs describe what may be characterized as a system which, given the regime(s) and current vibration data that will be input into the RTB function (characterizing a current state of a component or system), selects the "best" type(s) of adjustment, sensors, and solution strategy (which defines the decision space). The entire decision space may be divided into a plurality of partitions or individual decision spaces, each such partition or decision space representing one possible combination of selectable options for the RTB function. In another aspect, the entire decision space may be characterized as a set of decision spaces, each such decision space representing one possible combination of selectable options for the RTB function. Selection of one of the foregoing decision spaces (e.g., one set of options for use with RTB) may use a priori knowledge as to which decision space is appropriate based on previously obtained particular sensor values of the observation space (e.g. the vibration for each sensor and regime). The a priori information may include data stored in the data store 214 as described above. The a priori information may include previously gathered sensor data and what options for use with RTB are deemed appropriate for such corresponding sensor data as described above. The a priori information may also include sensor data obtained using other techniques such as through simulation.

Selection of an appropriate decision space may be modeled as a Bayesian decision problem, where in an optimal way, one picks the "best" decision space based on the observation space (previously obtained or observed sensor data values). The selection techniques used to evaluate and select the best decision space may be characterized as multiple instances of hypothesis testing, where the decision algorithm develops evidence from the observation space as to which decision space to select. If such evidence is sufficient, a null hypothesis (a default decision space) is rejected in favor of an alternative hypothesis (a more attractive decision space).

Figure 7:
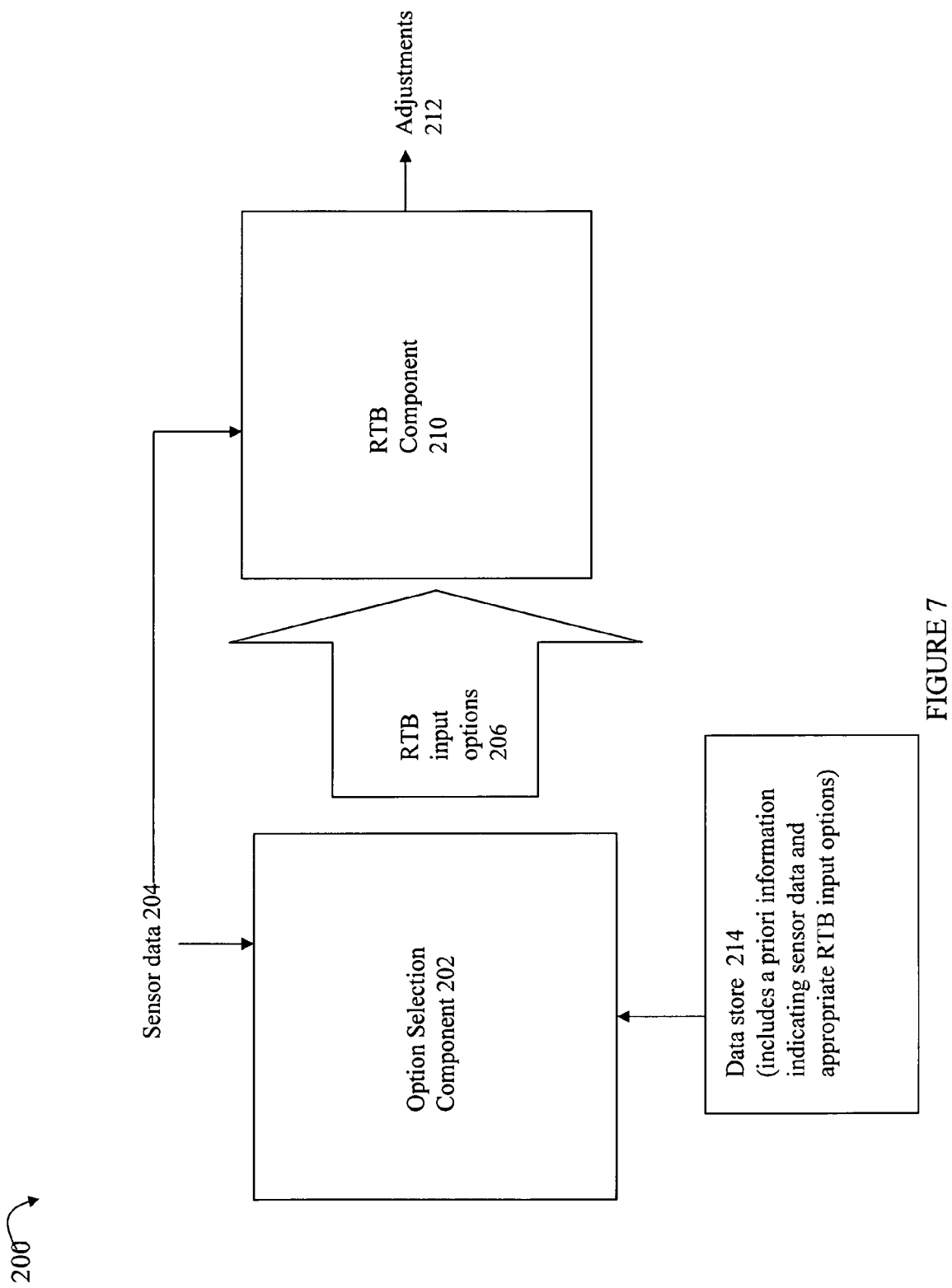
FIG. 7 is an example representation of components and information used in connection with selecting input options for use with a rotor track and balance (RTB) technique.

Referring to FIG. 7, shown is an example illustrating components that may be included in an embodiment in accordance with techniques herein. The example 200 includes an option selection component 202 and an RTB component 210. Component 202 may receive as inputs the sensor data 204 and information from the data store 214. As described above, the sensor data 204 may include, for example, vibration and/or track split data for one or more regimes. The data 204 may represent actual current conditions of a component of a helicopter or other system for which a current set of vibration data (or more generally sensor data) has been obtained. The component 202 performs processing to determine and output appropriate RTB input options 206 for the given sensor data 204 based on a priori information from the data store 214. The RTB component 210 may perform processing for the RTB technique as described herein using the RTB input options 206 and current sensor data 204. The RTB input options 206 may include a selection of options for use by RTB as described above. In one embodiment as described herein, the options 206 may indicate selections of one or more adjustment types (e,g., from all possible adjustment types such as PCRs, weights, inner tabs, and outer tabs), whether to use vibration and/or tracking, and what solution strategy (e.g., MV or MA) to use with RTB. The RTB component 210 may determine adjustments 212 to make for adjustment types with respect to the current system to reduce vibrations. Component 210 may determine an adjustment in accordance with the options 206. It should be noted that 210 may be more generally referred to as an adjustment determination component. For example, if only 2 particular adjustment types are selected in 206, the component 210 evaluates different candidate adjustments based on the 2 particular adjustment types. The a priori information included in the data store 214 may include previously observed sensor data and associated RTB input options previously selected for use by the RTB component 210 with the corresponding observed sensor data. In other words, the a priori information specifies which RTB input options are appropriate for use in determining an adjustment given a particular set of corresponding sensor data (e.g., different RTB input options may be appropriate depending on the currently measured sensor data characterizing a state of the system or component with respect to vibration).

Each of the components 202 and 210 may be implemented using hardware and/or software. For example, the component 202 may be implemented using code which is executed by a processor such as may be included in a computer system, on an ASIC, and the like.

As a simple example for use in connection with illustrating hypothesis testing for selecting a decision space partition, consider a binary system where the set of observations corresponds to a default or first decision space of (weight, PCR, Inner Tab, Outer Tab, vibration and track, MV) or some alternative or second decision space of (weights, inner tab, vibration only, and MA). After sampling the observation space (vibration and/or track data for sensors and regimes), let one assign two possible outcomes of a decision: $H_o$ or $H_1$. Note that without loss of generality, there may be M>2 decision space partitions in which case there would be multiple hypothesis tests. By convention, $H_o$ is called the null hypothesis and in this example, corresponds to the default decision space. H1 is the alternative hypothesis which corresponds to the alternative decision space. If there are 3 decision spaces, there would be a first hypothesis test of selecting the first or the second decision space as described above as well as a second hypothesis test of selecting the first or the third decision space.

Figure 8:
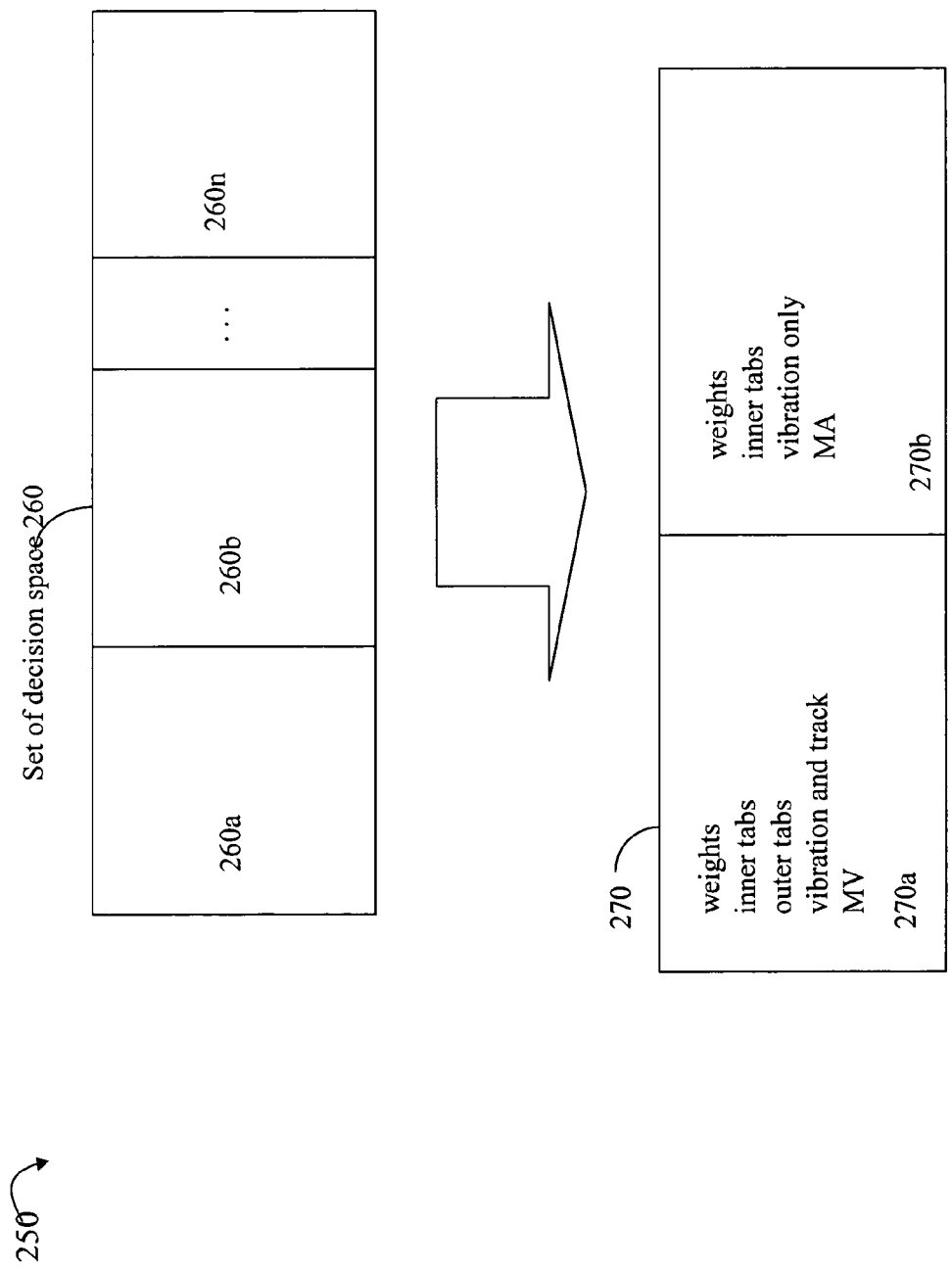
FIG. 8 is an example illustrating decision spaces of different input options that may be used in accordance with techniques herein.

Referring to FIG. 8, shown is an example representation of an entire set of decision spaces in an embodiment in accordance with techniques herein. The set of decision spaces 260 may generally include a plurality of "n" decision spaces denoted, respectively, 260a, 260b, 260n. Each decision space corresponds to a different possible combination of RTB input options 206. Element 270 represents the decision space set for the simple example currently considered for the two decision spaces described above. Element 270a represents the first decision space of weight, PCR, Inner Tab, Outer Tab, vibration and track, and MV solution strategy. Element 270b represents the second decision space of weights, inner tab, vibration only, and MA solution strategy.

An observation may be represented as a parameterized measurement of a system which is a function of some probabilistic law. The range of possible values for an acquired measurement (such as of a sensor measurement included in the sensor data 204) of a system may represent the range of possible values of the observation space. Based on this, the hypothesis-testing problem may be reduced to one of deciding which hypothesis represents truth, based on a current acquired measurement z. The range of possible values for z corresponds to the range of values for the observation space. The decision problem includes partitioning this observation space into two regions, $Z_1$ (default) and $Z_2$ (alternative). When z falls within range or region $Z_1$, we will say $H_o$ is true and when z falls within range or region Z2, we will say that $H_1$ is true. If z does not fall within the expected range of observed values, an error has occurred.

The foregoing generally describes hypothesis testing. The goal is to create a decision region including the set of decision spaces. A current measurement or observations falls into a region of the observation space. The region of the observation space is mapped to a selected one of the decision spaces. The foregoing may be performed while also seeking to minimize possible error. In the general case, the observation space consists of a set of parametric observations $ZZ=(z_1, z_2, \ldots, z_{n+1})$ with some joint probability density function $p(z_1, z_2, \ldots, z_{n+1})$.

Figure 9:
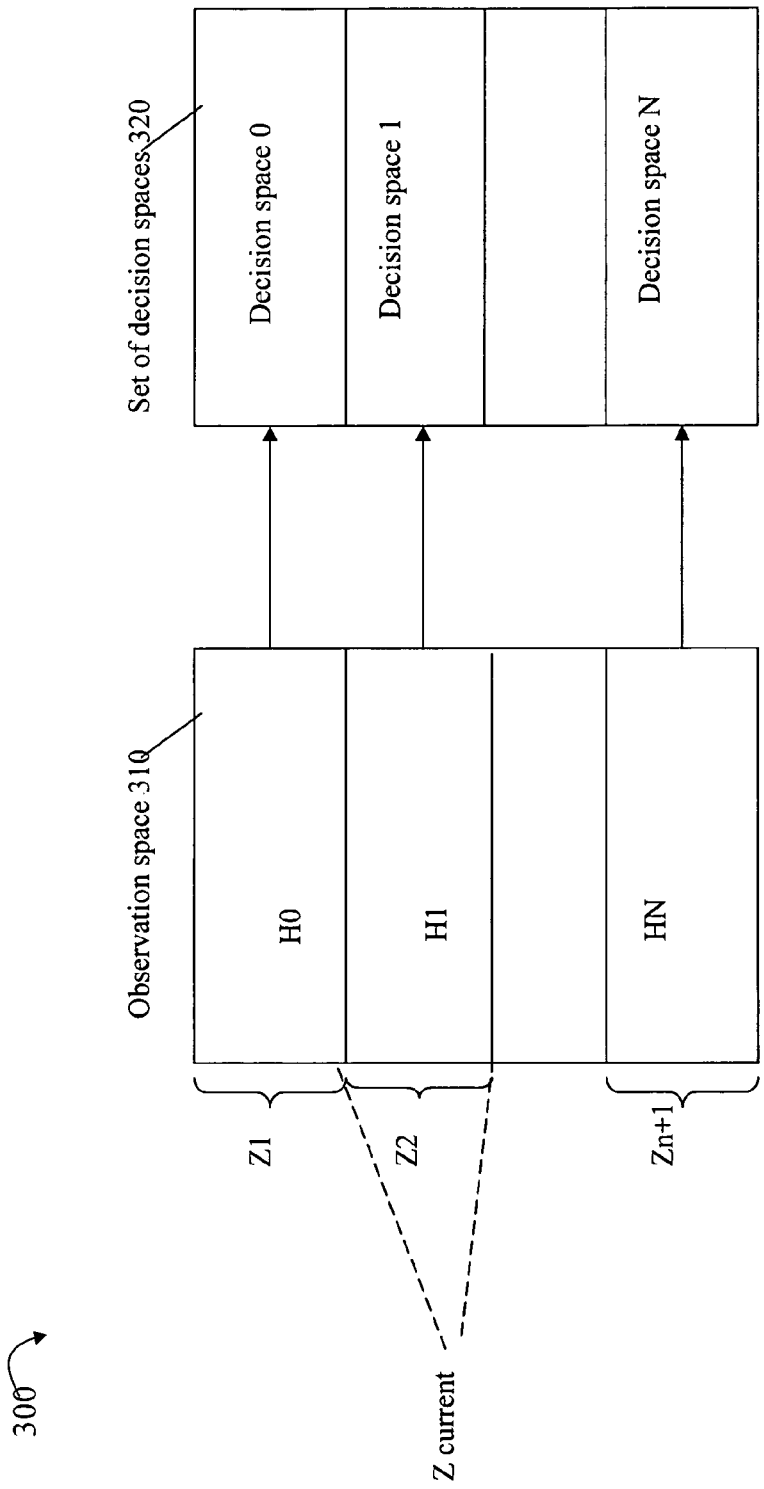
FIGS. 9 and 10 are examples illustrating selection of a decision space specifying input options for use with RTB for a set of one or more sensor values.

Referring to FIG. 9, shown is an example illustrating selection of an observation space region or partition for a current sensor measurement z, denoted as Z current. The observation space 310 may be partitioned into a plurality of "n" regions or partitions denoted, respectively, Z1, Z2, . . . , Zn+1. The observation space's range of sensor values may be represented parametrically by the set of parametric observations ZZ. A single element of ZZ may represent the range of possible observation space values for a corresponding observation space partition of 310. For example, $z_1$ of ZZ may represent the range of observation space values for the region Z1. Selection of a particular observation space partition of 310 is based on whether a particular hypothesis is true. FIG. 9 includes hypotheses H0 . . . HN corresponding, respectively, to observation space partitions Z1 . . . Zn+1. Selection of an observation space partition and associated hypothesis of 310 results in selection of a corresponding one of the decision spaces of 320. Each observation space partition of 310 maps to a corresponding one of the decision spaces of 320 as illustrated. Thus, as described above, an observation space partition is selected based on the measurement Z current (e.g. into which observation space partition Z current falls). Z current may be characterized as mapped to a particular decision space through probabilistic selection of an observation space using hypothesis testing.

Figure 10:
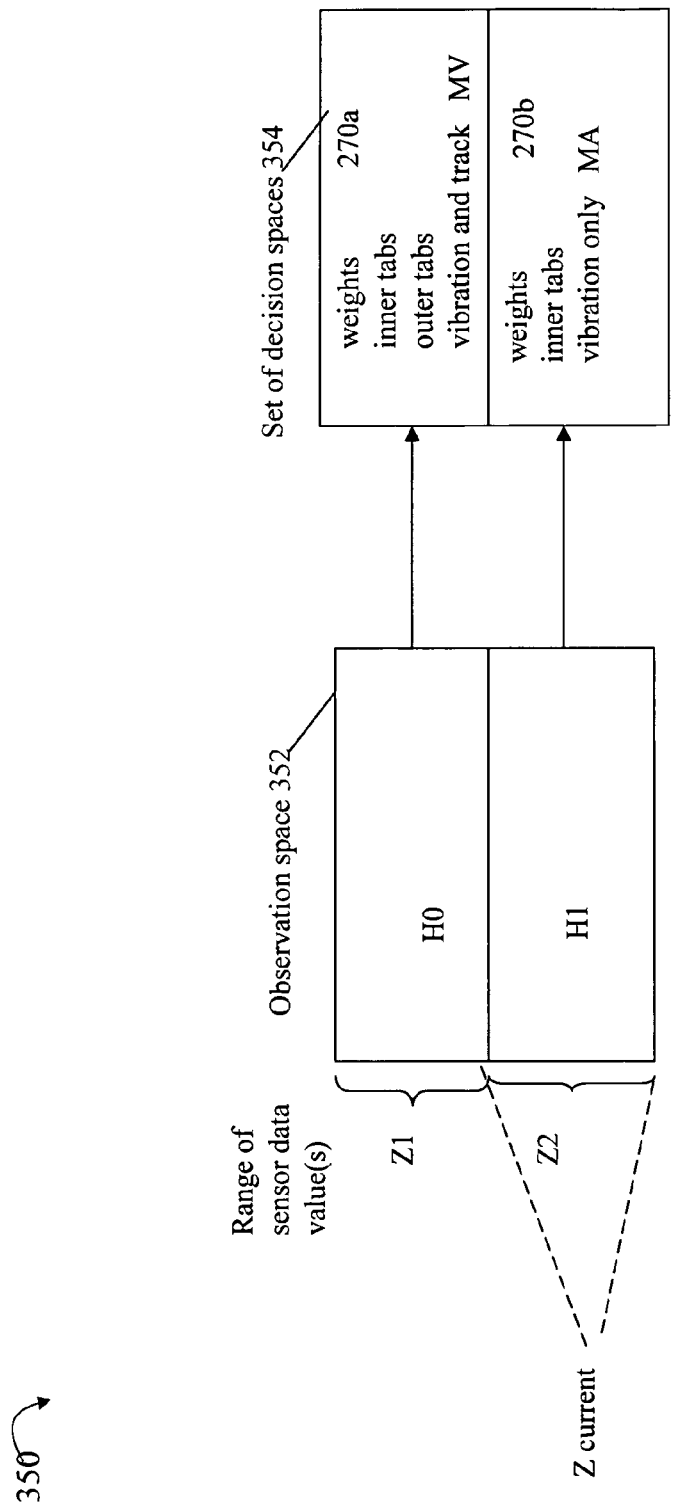

The example 300 of FIG. 9 illustrates a general case where Z current may fall within the observation space region Z2 indicating that hypothesis H1 evaluates to true and that decision space 1 is selected. FIG. 10 is a further illustration of the simplified example of element 270 of FIG. 8 for the two decision spaces 270a and 270b. The observation space 352 includes two partitions (Z1 and Z2) and associated hypotheses (H0 and H1). The set of decision spaces 354 includes 270a and 270b. Hypothesis H0 is true when Z current falls within observation space partition Z1. When H0 is true, decision space 270a is selected. Similarly, hypothesis H1 is true when Z current falls within observation space partition Z2. When H1 is true, decision space 270b is selected.

In the general case, the observation space consists of a set of parametric observations $z=(z_1, z_2, \ldots, z_n)$ with some joint probability density function $p(z_1, z_2, \ldots, z_n)$. What will now be described is how the observation space may be modeled using hypothesis testing.

We will define $P(H_i|z)$ the probability that $H_i$ was the true hypothesis given a measured observation z. Then the correct hypothesis is the one corresponding to the largest of m probabilities. The decision rule will be to choose $H_o$ if:

$$P(H_o|z) > P(H_1|z), P(H_2|z), \ldots P(H_m|z). \quad \text{EQUATION 24}$$

Or choose the largest $H_i$ otherwise. For the binary case, the rule becomes:

$$\frac{P(H_1|z)}{P(H_0|z)} \overset{H_1}{\underset{H_0}{\gtrless}} 1 \quad \text{EQUATION 25}$$

The notation used in connection with EQUATION 25 represents selecting $H_1$ if the quantity on the left hand side is less than 1, and otherwise selecting H0 (if the quantity on the left hand side is more than 1). Notation as used in EQUATION 25 is used in connection with other equations herein.

EQUATION 25 may be characterized as the maximum a posteriori probability criterion, with the chosen hypothesis corresponding to the maximum of two posterior probabilities. Using Bayes rules to write the criterion gives:

$$P(H_i|z) = \frac{p(z|H_i)P(H_i)}{p(z)}, i = 0, 1 \quad \text{EQUATION 26}$$

where $P(H_i)$ is the probability of $H_i$ in the observation space, such that:

$$\frac{P(H_1|z)}{P(H_0|z)} = \frac{p(z|H_1)P(H_1)}{p(z|H_0)P(H_0)} \quad \text{EQUATION 27}$$

This allows the test to become:

$$\frac{p(z|H_1)}{p(z|H_0)} \overset{H_1}{\underset{H_0}{\gtrless}} \frac{P(H_0)}{P(H_1)} \qquad \text{EQUATION 28}$$

The ratio $\Lambda(z)=p(z|H_1)/p(z|H_0)$ is defined as the likelihood ratio. If we define the likelihood ratio to be well behaved and everywhere differentiable, then without loss of generality, the natural logarithm of both sides can be taken. Since the logarithm is a monotonically increasing function, the inequality in the decision rule holds and the decision rule can be expressed in terms of the log-likelihood ratio:

$$\ln \Lambda(z) \overset{H_1}{\underset{H_0}{\gtrless}} \ln \frac{P(H_0)}{P(H_1)} \qquad \text{EQUATION 29}$$

In making a decision in a binary hypothesis-testing problem, there are four possible outcomes:
  Say $H_o$ and the null hypothesis is true,
  Say $H_1$ and the alternative hypothesis is true,
  Say $H_1$ and the null hypothesis is true, and
  Say $H_o$ and the alternative is true.

The third condition or outcome above is a type I error and is referred to as a false alarm ($P_F$). The forth condition is a type II error and is referred to as a missed detection ($P_M$). The probability of detection ($P_D$) is 1 minus the probability of miss.

Once a decision has been made, there are consequences and an associated cost. The consequences of one decision may not be the same as the consequences of a different decision. In the context of contact identification, the consequences of identifying a hostile contact are different from not correctly identifying the hostile. Therefore one can define $C_{ij}$ to be the cost associated with making a decision $D_i$ with the true hypothesis is $H_j$. If one defines the joint probability function $P(D_i, H_j)$ such that one says $H_i$ when in fact $H_j$ is true, the decision criterion which minimizes the probability of error is the maximum a posteriori (MAP) test as described, for example, in M. D. Srinath, et al, *Introduction to statistical signal processing with applications*, Prentice-hall, 1995.

$$\bar{C} = C_{00}P(D_0,H_0) + C_{01}P(D_0,H_1) + C_{10}P(D_1,H_0) + C_{11}P(D_1,H_1) \qquad \text{EQUATION 30}$$

The associated decision rule becomes the likelihood ratio test:

$$\frac{p(z|H_1)}{p(z|H_0)} \overset{H_1}{\underset{H_0}{\gtrless}} \frac{P(H_0)(C_{10}-C_{00})}{P(H_1)(C_{01}-C_{11})} \qquad \text{EQUATION 31}$$

The MAP test is also known as the optimal observer because it minimizes the average error. As such, it is an upper bound on the performance of a decision algorithm for a given set of parameters.

What will now be described is use of a Bayesian classifier for the Normal Distribution in connection with techniques herein.

The Normal distribution is a valid model of the data. In the case where there is an n dimensional observation space, due to the Central Limit Theorem, the Normal distribution should be the default model. For the generalized, n dimension decision space, $$H_0: z = V \qquad \text{EQUATION 32A}$$

$$p(z|H_0) = 1/(2\pi)^{n/2} |\Sigma_0|^{-1/2} \exp[-z^T \Sigma_0^{-1} z] \qquad \text{EQUATION 32B}$$

and $$H_1: z = V + mm \qquad \text{EQUATION 33A}$$

$$p(z|H_1) = 1/(2\pi)^{n/2} |\Sigma_1|^{-1/2} \exp[-(z-mm)^T \Sigma_0^{-1}(z-mm)] \qquad \text{EQUATION 33B}$$

In the above EQUATIONS 32A and 32B, V represents the default set of observation space values for when H0, the null hypothesis, is true and the measurement z maps to H0 and its associated portion of the observation space. In the above equations and elsewhere herein, exp(x) denotes e to the x power based on Euler's number (e.g., inverse of natural log).

In the above EQUATIONS 33A and 33B, "V+mm" represents the set of observation space values for when H1, the alternative hypothesis, is true and the measurement z maps to H1 and its associated portion of the observation space.

Now define the normalized distance squared between z and m as:

$$d^2 = (z-m)^T \Sigma^{-1}(z-m) \qquad \text{EQUATION 34}$$

where "m" represents the mean value with respect to a probability distribution and "z-m" represents the distance of the value "z" from that mean "m".

It can be show that the log likelihood ratio test then is:

$$1/2[d_0^2 - d_1^2] \overset{H_1}{\underset{H_0}{\gtrless}} -\ln\left(|\Sigma_0|/|\Sigma_1|\right)^{1/2} \qquad \text{EQUATION 35}$$

where each $\Sigma i$ is a covariance and $|\Sigma i|$ is the determinant of the covariance $\Sigma i$; $d_0$ represents the distance using EQUATION 34 for a first probability distribution D0 for H0 (null hypothesis) having mean m0; and $d_1$ represents the distance using EQUATION 34 for a second probability distribution D1 for H1 (alternate hypothesis) having mean m1. Each of the probability distributions D0 and D1 has its own respective mean, m0 and m1. The distance quantities $d_0$ and $d_1$ are with respect to each such mean and the current data value "z" which we are trying to classify.

EQUATION 31 is a ratio of two probabilities—p(z/H1) and p(z/H0)—where the numerator p(z/H1) can be represented by EQUATION 33B and the denominator p(z/H0) can be represented by EQUATION 32B. If the foregoing substitutions for the numerator and denominator using EQUATIONS 32B and 33B are made in EQUATION 31, the result is EQUATION 35.

With reference to EQUATION 35, the two covariance values $\Sigma_0$ and $\Sigma_1$ are the same. The term on the right hand side of EQUATION 35:

$$-\ln(|\Sigma_0|/|\Sigma_1|)^{1/2}$$

goes to zero. Based on the foregoing, EQUATION 35 states that if the normalized distance $d_0$ between z and m0 is greater than the normalized distance $d_1$ between z and m1, then accept the alternate hypothesis H1; otherwise accept the null hypothesis H0.

For column-vector valued random variables X (with m columns) and Y (with n columns) and their expected (or mean) values µ=E(X) and v=E(Y), the covariance matrix $\Sigma$ (also denoted Cov (X,Y)):

$$Cov(X,Y)=E((X-\mu)(Y-v)^T)=E(XY)^T\mu v^T \qquad \text{EQUATION 36}$$

is the m×n matrix that has in row i and column j the covariance $Cov(z_i, x_j)$ of the $i^{th}$ scalar component of X and the $j^{th}$ scalar component of Y. Hence, Cov(X, Y) and Cov(Y, X) are each other's transposes. The "T" superscript denotes the matrix transposition operation. As known in the art, the covariance matrix is a matrix of covariances between elements of a random vector. As an example in connection with techniques herein, the variables X and Y in EQUATION 36 may each correspond to a vector of sensor values for a same sensor at a plurality of regimes, each vector element corresponding to a sensor value for the sensor in that regime.

What will now be described is use of linear operators and transformations to minimize error.

Let one define a linear transformation of a n dimensional vector z into another n dimensional vector y by expressing it as a function of z, such that: $y=A^T z$, where A is a transformation matrix. The expected value of z is:

$$m_z = E\{z\}. \qquad \text{EQUATION 37}$$

Then the expected value of y is:

$$m_y = E\{y\} = A^T E\{z\} = A^T m_z. \qquad \text{EQUATION 38}$$

The covariance of y is now:

$$\sum_y = E\{[y-m_y][y-m_y]^T\} \qquad \text{EQUATION 39A}$$
$$= A^T E\{[z-m_z][z-m_z]^T\}A \qquad \text{EQUATION 39B}$$
$$= A^T \sum_z A. \qquad \text{EQUATION 39C}$$

This defines a new distance function:

$$d_y^2 = (y-m_y)^T \sum_y^{-1} (y-m_y)$$
$$= (z-m_z)^T A A^{-1} \sum_z^{-1} (A^T)^{-1} A^T (z-m_z)$$
$$= (z-m_z)^T \sum_z^{-1^T} (z-m_z)$$
$$= d_z^2$$

Note that distance is invariant under any non-singular linear transformation.

It is desirable to maximize distance between two classes to minimize the chance of a "false alarm" or misclassification. Let one define a new function x=z−m (e.g. a shift in space, where "m" represents the mean and "z−m" is the distance of a value z from the mean "m"), such that $d^2(x)=z^T\Sigma z$, which is the normalized distance between two probability distributions. Now, let one find a z that maximizes the distance function, subject to the side constraint $z^T z=I$, the identity matrix. Using the standard Lagrange multiplier µ to find the local extrema (e.g. the maximum), a partial derivative with respect to z is obtained in the following:

$$\partial/\partial Z\{z^T\Sigma^{-1}z-\mu(z^Tz-I)\}=2\Sigma^{-1}z-2\mu z$$

which may be set to zero to find the extrema and solving for z:

$$\Sigma^{-1}z=\mu z \text{ Or } \Sigma z=\lambda z$$

where $\lambda=1/\mu$.

In order that a non-null Z exits, $\lambda$ must be chosen to satisfy the determinant: $|\Sigma-\lambda I|=0$. The solution to the foregoing is that $\lambda$ are the eigenvalues of z and $\Sigma$ is the corresponding eigenvectors. If $\Sigma$ is a symmetric n×n matrix (e.g. a covariance matrix), there are n real eigenvalues ($\lambda_1 \ldots \lambda_n$) and n real eigenvectors $\phi_1 \ldots \phi_n$. The eigenvectors corresponding to two different eigenvalues are orthogonal. The characteristic equation may be written as:

$$\Sigma\Phi=\Phi\Lambda, \Phi^T\Phi=I,$$

where $\Phi$ is an n×n matrix consisting of n eigenvectors and $\Lambda$ is a diagonal matrix of eigenvalues (e.g. the eigenvector matrix and eigenvalue matrix, respectively). In this case, "y" which represents the coordinated shifted value of z, may be represented as follows using $\Phi$ as the transformation matrix A:

$$y=\Phi^T z,$$

then $\Sigma_y = \Phi^T \Sigma_z \Phi = \Lambda$, where $\Lambda$ is a diagonal matrix (e.g., there is no cross correlation—the variance of Y is now independent). Of note is that the diagonalization means one can obtain uncorrelated random variables, and the eigenvalues are the variance of the transformed variables yi's. The foregoing can be expanded to find a transformation that generates a diagonal covariance equal to I. (e.g., so that the covariance of Y=I, the identity matrix).

$$y = \Lambda^{-1/2}\Phi^T z$$
$$= (\Phi\Lambda^{-1/2})^T z,$$
$$\sum_y = \Lambda^{-1/2}\Phi^T \sum_z \Phi\Lambda^{-1/2}$$
$$= \Lambda^{-1/2}\Lambda\Lambda^{-1/2}$$
$$= I$$

The transformation that maximizes the distance between distributions or classes is $$A=\Lambda^{-1/2}\Phi^T \qquad \text{EQUATION 40}$$

The foregoing transformation is not orthonormal as illustrated by:

$$(\Phi\Lambda^{-1/2})^T\Phi\Lambda^{-1/2} = \Lambda^{-1/2}\Phi^T\Phi\Lambda^{-1/2}$$
$$= \Lambda^{-1}, \text{ which is not } I$$

indicating that the Euclidean distances are not preserved and that the separation between the two distributions is maximized.

In the cases where the covariances $\Sigma_1, \Sigma_2$ of the two distributions are not equal, it is necessary to simultaneously diagonalize the covariance (as per the Lagrangian) to maximize the distance between the distributions. The process is to whiten $\Sigma_1$, by $y=\Lambda^{-1/2}\Phi^T z$, then the y's corresponding covariance are:

$$\Lambda^{-1/2}\Phi^T\Sigma_1\Phi\Lambda^{-1/2}=I,$$

Applying the transformation to $\Sigma_2$ results in:

$$\Lambda^{-1/2}\Phi^T\Sigma_2\Phi\Lambda^{-1/2}=K.$$

However, K is not diagonal. Now K must be diagonalized by an appropriate orthonormal transformation:

$$w=\Psi^T y,$$

where $\Psi$ is the eigenvector matrix of K such that $\Psi^T K\Psi=\Lambda$, which is diagonal. Combining these processes give the overall transformation matrix $$A=\Phi\Lambda^{-1/2}\Psi. \qquad \text{EQUATION 41}$$

What will now be described is maximizing the separation using the Bayesian Classifier in connection with techniques herein. The whitening process utilizing the above-mentioned transformation matrix that maximizes the separation between distributions will now be applied to the Gaussian Bayes Classifier. The Gaussian distribution is appropriate for most n dimensional classifier problems. The Central Limit Theorem proves that as n increases, the distribution of becomes more normal. (It will be appreciated by those of ordinary skill in the art, in the case of heavily skewed distributions or small parameters sets, a similar whitening process can be performed through optimization). Given this, the log likelihood decision rule of EQUATION 35 becomes:

EQUATION 42

$$h(z) = -\ln \ell(z)$$
$$= \frac{1}{2}(z-M_1)^T \sum_1^{-1}(z-M_1) - \frac{1}{2}(z-M_2)^T \sum_2^{-1}(z-M_2) +$$
$$\frac{1}{2}\ln\frac{|\sum_1|}{|\sum_2|} \underset{\omega_2}{\overset{\omega_1}{\lessgtr}} \ln\frac{P_2}{P_1}$$

where $\Sigma E_1^{-1}$ is the inverse covariance for the covariance $\Sigma_1$ as related to the null hypothesis and its distribution, $\Sigma_2^{-1}$ is the inverse covariance for the covariance $\Sigma_2$ as related to the alternative hypothesis and its distribution, "z" represents the sensor value(s) characterizing the current system (e.g., z is being classified), $M_1$ represents the observed value (or mean) for the null hypothesis to which z is being compared (e.g., the distance is being determined between the observed value $M_1$ and the current data value z), $M_2$ represents the observed value (or mean) for the alternative hypothesis to which z is being compared (e.g., the distance is being determined between the observed value $M_1$ and the current data value z), $P_1$ represents the probability of the null hypothesis H0, and $P_2$ represents the probability of the alternative hypothesis H1.

Diagonalizing the coordinated shifted value y using EQUATION 41

$$A=\Lambda^{-1/2}\Phi\Psi$$

and defining I, K and L as:

$$A^T\Sigma_1 A=I \qquad \text{EQUATION 43A}$$

$$A^T\Sigma_2 A=K \qquad \text{EQUATION 43B}$$

$$L=A^T(M_2-M_1) \qquad \text{EQUATION 43C}$$

Now $(\Sigma_1^{-1}-\Sigma_2^{-1})^{-1}$ is transformed to a diagonal matrix $\Lambda$ by A as:

$$\Lambda = A^T[A(I-K^{-1})A^T]^{-1}A$$

which may be substituted into the log likely decision rule of EQUATION 42 resulting in the discriminant function:

$$h(z) = \frac{1}{2}z^T\Lambda^{-1}z - \left[(-K^{-1}L)^T\right] \qquad \text{EQUATION 44}$$
$$z + \left[-\frac{1}{2}L^T K^{-1}L - \frac{1}{2}\ln|K| - \ln\frac{P_2}{P_1}\right]$$

Thus, if the result of EQUATION 44 is less than the threshold, such as ln (P2/P1), choose class 1, $\omega 1$ representing the null hypothesis H0. If the result of EQUATION 44 is more than the threshold, choose class 2 $\omega 2$ representing the alternative hypothesis H1.

Note that in the case where the covariances are the same, there is considerable reduction in computation effort in connection with EQUATION 44 due to cancellation of terms.

The derived EQUATION 44 (and also EQUATION 42) may be simplified for use in connection with the RTB techniques described herein based on simplifying assumptions that can be made. There is no covariance or inverse covariance so that covariances $\Sigma_0$ and $\Sigma_1$ (as well as inverse covariances $\Sigma_0^{-1}$ and $\Sigma_1^{-1}$) are zero. Instead, an embodiment may define inverse variance as a preference, importance or degree of confidence indicator P indicating a weight applied to a particular sensor data. Note that if there is a large variance in connection with a particular set of sensor values, P may be less/decrease in comparison (e.g., relative) to other values having a smaller variance. As the variance increases, there may be less confidence in the value and therefore such values having larger variances may be given less weight in terms of importance. In one embodiment, preference or P values may be specified on a scale of 1 to 10, with 1 being lowest, and 10 being highest in terms of importance and preference. Based on the foregoing, the decision algorithm (e.g., as based on EQUATIONS 42 and 44) simplifies to:

$$h(z) = (z-M_1)^2 INF_1 - (z-M_2)^2 INF_2 + \qquad \text{EQUATION 45}$$
$$\ln\left(\prod INF_2\right) / \prod INF_1 \underset{\omega_2}{\overset{\omega_1}{\lessgtr}} 0$$

In connection with EQUATION 45, we assume that the correlation between regime/sensor is zero or near zero. If that is the case, we can define $\Sigma_i^{-1}$ as a the information vector, $INF_i$. This allows for more compact configuration (e.g. n scalars representing the vector INF and M for each regime/sensor i) and removes the necessity to whiten the measurement.

For the more general case where there are multiple decision spaces (i>2), the first decision space is taken at the null hypothesis, and i=2 to N alternative hypothesis are tested. If all h(z) values are less than zero, the default (null) hypothesis is taken. Otherwise, the index, i, with the greatest value of h(z) is the most likely decision space.

Following is a pseudo code description of EQUATION 45 as may be implemented, for example, using software and/or hardware. It is noted that the indices associated with the decision spaces begin with 1 so that "H(1)" corresponds to the null hypothesis.

Y: a vector of the decision space values (e.g., selected RTB input options including adjustment types, whether to use track/no track and solution strategy)

$M_i$: for the decision space i, a vector of the desired a priori observation values in sensor/regime j $INF_j$: for the decision space i, the preference or importance (information) of that observation value in sensor/regime j. Note that the inverse of covariance is the Fisher's Information matrix, and represents that value of the data. Large variance represents less information and a lesser importance (e.g. low preference) in the values represented by sensor/regime j.

K: K decision spaces, indexed as 1 . . . K

Prod (INFn): Mathematical product of all INF's for decision space n

Z: a vector of sensor data values currently observed for a system

It should be noted that Prod(INFi) is equivalent to the determinant of the inverse covariance, if the covariance matrix has no values in the off diagonal terms (e.g., if the covariance matrix only has non-zero values in the diagonals with all other off-diagonal entries being zero).

$$Y1 = (Z - M_1)^2 * INF_1;$$

$$T1 = \text{Prod}(INF_1) / \text{*product of all Ps for decision space 1*/}$$

For i=2:K, $$H(i) = Y1 - (Z - M_i)^2 * INF_i + \ln(\text{Prod}(INF_i)/T1);$$

End

If all H(i)<0, for i=2:K, select decision space=Y(1);
/*first decision space, null hypothesis is true*/
Else
select decision space Y(XX) where H(XX) is the maximum of all H(i), for i=2:K Based on the foregoing, if there are 4 possible decision spaces, we calculate H(2), H(3) and H(4) as represented below:

$$H(2) = [(z - M_1)^2 * INF_1] - [(z - M_2)^2 * INF_2] + \ln\left[(\text{Prod}(INF_2)/(\text{Prod}(INF_1))\right]$$

$$H(3) = [(z - M_1)^2 * INF_1] - [(z - M_3)^2 * INF_3] + \ln\left[(\text{Prod}(INF_3)/(\text{Prod}(INF_1))\right]$$

$$H(4) = [(z - M_1)^2 * INF_1] - [(z - M_4)^2 * INF_4] + \ln\left[(\text{Prod}(INF_4)/(\text{Prod}(INF_1))\right]$$

If all of H(2), H(3) and H(4) are less than 0, then decision space 1, corresponding to the null hypothesis, is selected. Otherwise, the maximum value of H(2), H(3) and H(4) is determined and the corresponding "i" decision space having the maximum H(i) is selected.

It should be noted that the result is a comparison of a first probability that the null hypothesis (decision space 1) is true to a corresponding probability for each of the decision spaces that said each decision space is true. The decision space "i" which is selected has the largest such probability. In connection with the above 4 decision spaces each corresponding to one of 4 hypothesis being true, equation H(2) compares hypothesis 1 (null hypothesis) to hypothesis 2, H(3) compares hypothesis 1 to hypothesis 3, and H(4) compares hypothesis 1 to hypothesis 4.

Figure 11:
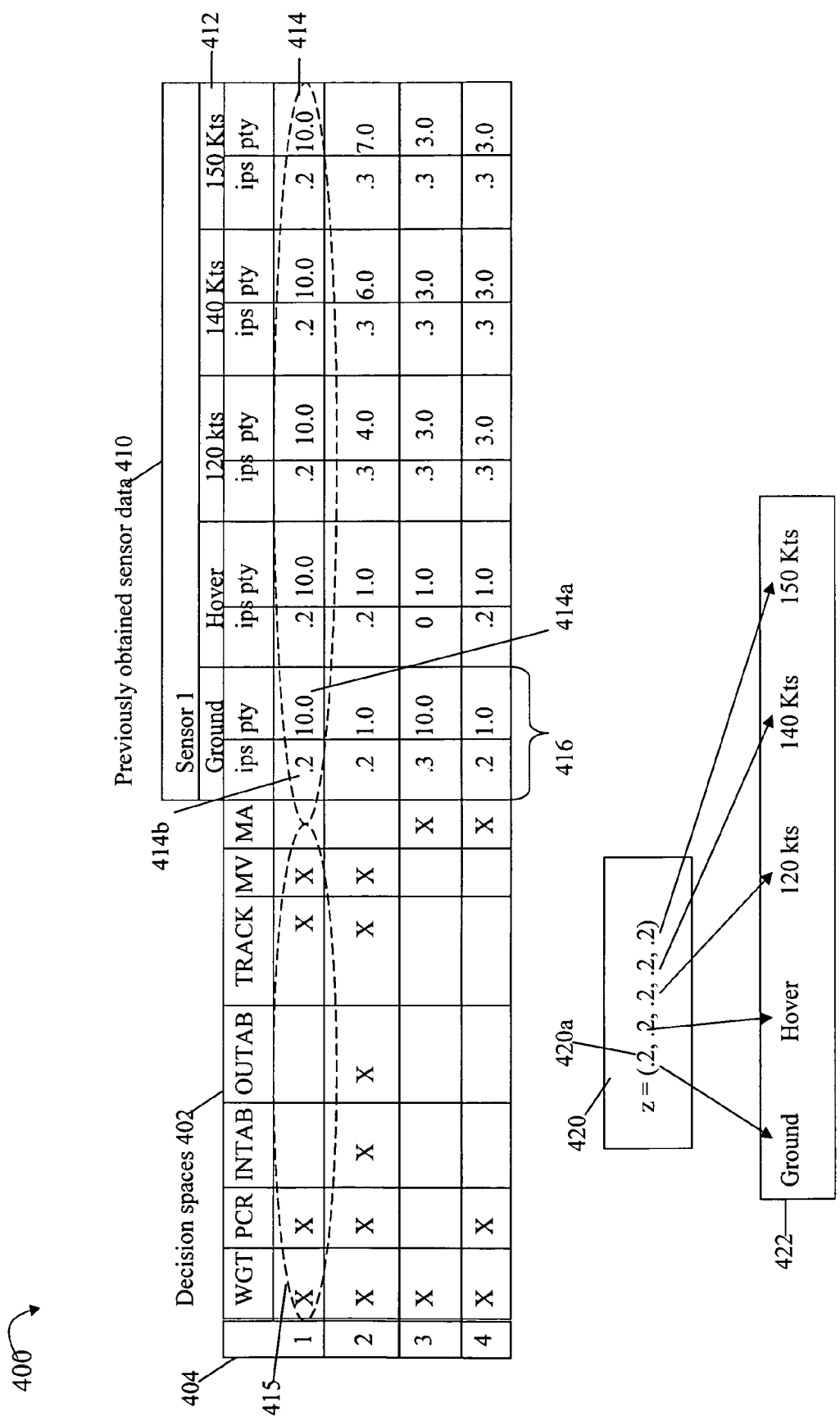

In connection with FIG. 11 in following paragraphs, provided is a further illustration utilizing EQUATION 45 and the above-referenced pseudo-code description with exemplary a priori information including 4 decision spaces and associated sensor data.

Referring to FIG. 11, shown is an example illustrating a priori knowledge or information as may be stored in a data store for use in an embodiment in connection with techniques herein. The example 400 illustrates an a priori knowledge space that includes previously obtained sensor data 410 and a set of decision spaces 402. The decision spaces 402 list the possible options that may be selected for use with the RTB technique including 5 possible adjustment types of weights (WGT), PCR, inner tab (INTAB), outer tab (OUTAB), whether to use tracking or not, and whether to use the MV or MA solution strategy. The decision spaces 402 include 4 decision spaces, each corresponding to a different row within 402. Column 404 indicates an index for each possible decision space represented by a row in 402. An "X" in a cell or entry within a row of 402 means that a particular option is selected as active for that row and corresponding decision space. For example, for decision space 1, WGT and PCR adjustments types are selected along with tracking and the MV solution strategy. The techniques herein use the process described above to select one of the decision spaces or rows of 402. One way in which the process to select a decision space may be implemented is described above in accordance with the pseudo-code description and EQUATION 45.

The a priori knowledge space may include previously obtained sensor data 410. Sensor data of 410 may have been previously acquired through observations, simulation, using empirical knowledge of an expert, or using any other suitable technique to populate 410. In this example, a simplified set of such data is included for purposes of illustration for a single sensor at 5 different regimes (ground, hover, 120 knots, 140 knots and 150 knots) as indicated by 412. For each such regime for the single sensor, a pair of values is specified including a sensor data value (e.g., ips) and an associated priority or preference (e.g., pty). For example, column 416 denotes sensor values and preferences for the ground regime for sensor 1 where the sensor data value is a vibration measured in inches per second (ips) with a corresponding level of preference (pty). It should be noted that the values in the "pty" columns of 410 correspond to the preference or information values (INF values) as described above in connection with the pseudo-code description and EQUATION 45. The pty values correspond to weighting factors that may be applied in connection with determining a distance or difference between a priori sensor values of 410 and currently measured or observed value z 420 representing sensor readings for the current system. As described above, the pty values may also represent the inverse covariance used as the foregoing weighting factor.

The information in tables 402 and 410 may be collectively examined for use with the techniques herein on a row by row basis. The options specified in a row of 402 have been selected for use with RTB given the sensor values included in the same corresponding row of 410. For example, element 415 indicates the options that have been determined for use with RTB when the sensor data values are as represented in 414. Element 420 may represent "z", a set of sensor data values of the currently measured vibrations of an aircraft where each element of 420 corresponds to a sensor measurement taken in one of the regimes of 422. The techniques described above determine which row of 410 is a best match for, or most similar to, the sensor data values of 420 by evaluating the weighted normalized distances between z and each set of previously acquired sensor data included in 410 of the a priori knowledge space. In other words, a comparison is made between z 420 and each of the sets of sensor data as represented by a row of 410. The foregoing comparison or evaluation results in selecting one of the sets of sensor data of 410 (e.g., a row from 410) and also a corresponding decision space of the same row.

For a given set of sensor data as included in a row of 410, a set of corresponding RTB options may be selected (e.g, as indicated by the corresponding row in 402) by an expert or, more generally, one knowledgeable about what RTB options are appropriate or preferred for a given set of sensor measurements. The a priori information of 402 and 410 indicating what decisions space to select for a given set of sensor data values may be characterized as predetermined or previously determined relative to the processing performed in connection with evaluating currently observed sensor data "z". The previously acquired knowledge is represented by the a priori information of what decision space of 402 is appropriate for a given set of sensor data of 410 (e.g., which in example 400 are in the same row). Such previously acquired knowledge may be used in connection with techniques herein to determine an appropriate decision space of 402 for current sensor data value(s).

With reference back to EQUATION 45 and the above-referenced pseudo-code description, the values in a single row of 410 may be represented as a vector V in manner similar to that as represented by 420 for z. For the expression of the form "z−Mi" as used in EQUATION 45, "Mi" may correspond to V and "z" of EQUATION 45 corresponds to z 420. The difference between such vectors may be determined as a difference between corresponding vector elements and then summing such differences. For example, if z=(A1, B1, C1, D1, E1) and V=(A2, B2, C2, D2, E2), then "z−V" may be determined as the sum of (A1-A2), (B1-B2), (C1-C2), (D1-D2), and (E1-E2). Since each such difference between vector elements is weighted in accordance with EQUATION 45, each such difference may be multiplied by its corresponding P (pty) value. For example, when subtracting sensor values. A1 and A2 indicated, respectively, by 420a and 414b, the difference may be multiplied by the pty value of 414a.

Additionally with reference to EQUATION 45 and the above-referenced pseudo-code description, Prod(INFi) may represent the mathematical product obtained by multiplying together each of the "pty" or INF values in a row "i". For example Prod (INF1) for row 1 of 410 may be determined as $(10.0)^5$ as a result of multiplying the pty values specified for each of the 5 regimes.

The above-referenced pseudo-code description may be used to select one of the 4 decision spaces 402 by comparing and evaluating z 420 with respect to each of the 4 rows of sensor data in 410. Each row "i" of sensor data in 410 corresponds to an instance of Mi. The evaluating includes, for each row of sensor data (Mi) in 410, determining a normalized distance squared between "z" and the row of sensor data. The foregoing is then weighted by preference (INF value) indicating a level of importance. As described above, alternatively, the inverse covariance with respect to the sensor data in 410 may be used as a weighting factor. Using the techniques herein as described above, decision space 1 415 is selected for the given z 420.

The representation of data included in FIG. 11 is simplified for purposes of illustration and includes 4 decision spaces and sensor data for a single shaft order (SO) 1, a single sensor and 5 regimes. It will be appreciated that the information of FIG. 11 may be generalized in an embodiment in accordance with techniques herein to include any number of decision spaces as well as sensor data for any number of regimes, sensors and shaft order (SOs).

Referring to FIG. 12, shown is an example 500 of a more general representation of the a priori information including decision spaces and associated previously obtained sensor data that may be used in an embodiment in connection with techniques herein. The example 500 includes "n" decision spaces 502 and previously obtained sensor data 504 for "NN" sensors. For each of the NN sensors, the 504 includes sensor data and associated preference (pty) values for M regimes and, within each regime, for two shaft orders—SO1 and SO2.

Figure 13A:
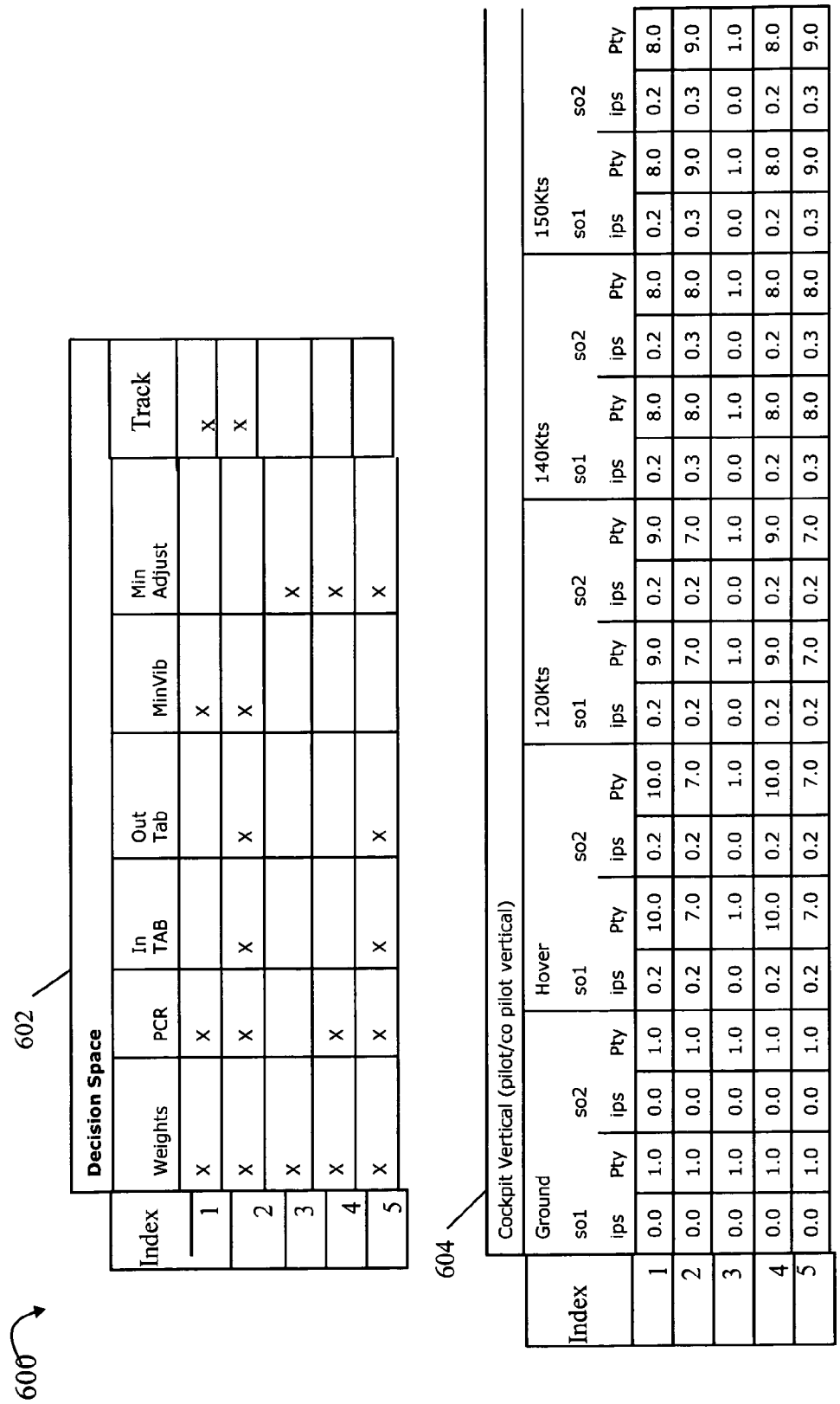

Referring to FIGS. 13A, 13B and 13C, shown are examples further illustrating the a priori information that may be used in an embodiment in accordance with techniques herein. FIG. 13A includes illustrates 5 decision spaces in table 602, one decision space per row. Each of the following elements: 604 of FIG. 13A, 650 and 654 of FIG. 13B, and 682 of FIG. 13C may include previously obtained sensor data for a different virtual sensor. Element 604 includes sensor data for the cockpit vertical or pilot/co-pilot virtual sensor. Element 650 includes sensor data for the cabin roll vertical sensor. Element 654 includes sensor data for the cabin lateral virtual sensor. Element 682 includes sensor data for track splits. It should be noted that measurements included in 604, 650 and 654 may be in units of "ips" and measurement in 682 may be in millimeters. In accordance with the general representation of element 504 of FIG. 12, the sensor data of 604, 650, 654 and 682 may be concatenated to form 5 rows of data. Each of the foregoing 5 rows of data may be associated with a corresponding row of 602 to indicate a decision space of RTB options selected given the corresponding row of sensor data.

Figure 14:
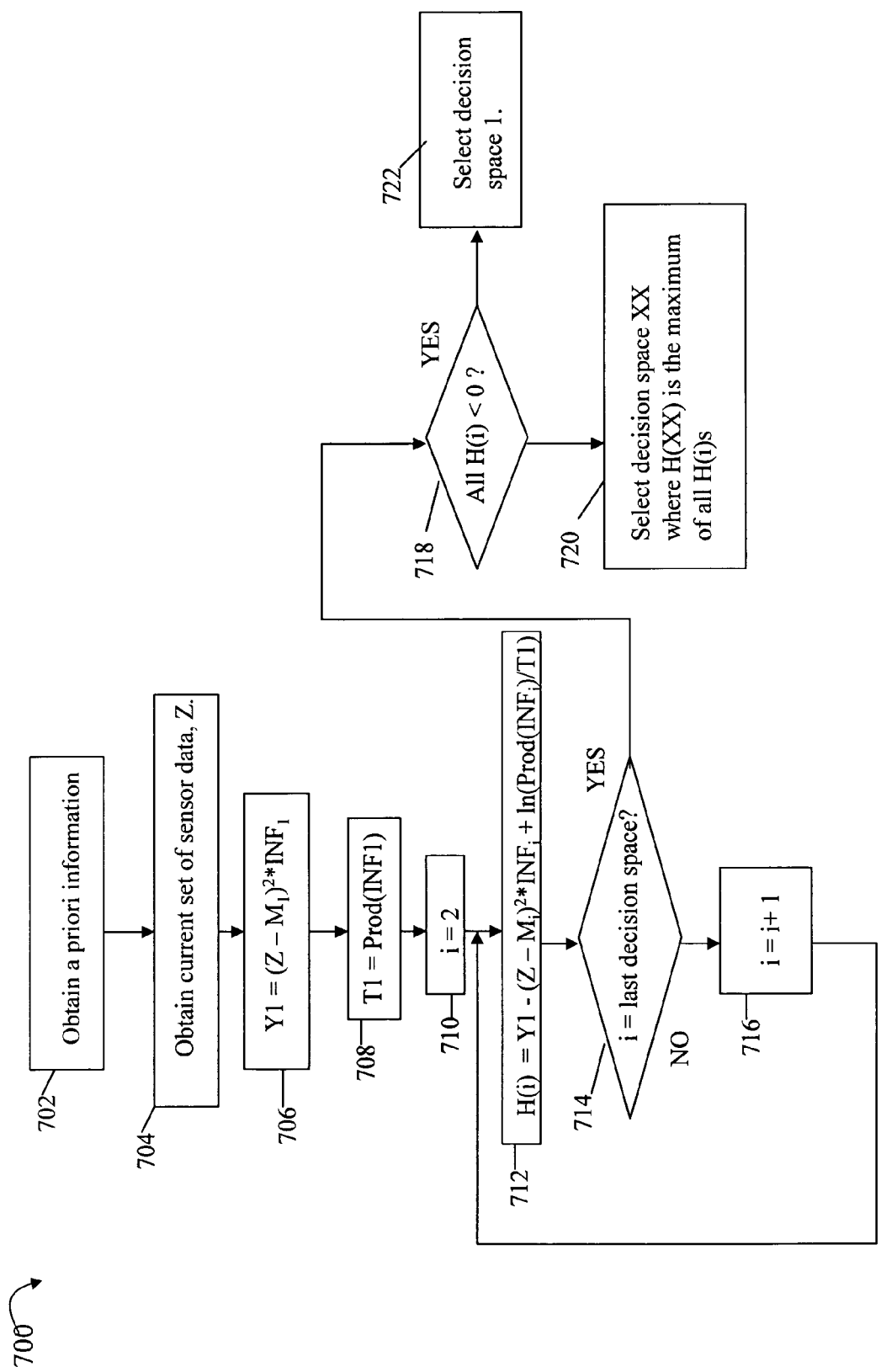
FIG. 14 is a flowchart of processing steps that may be performed in an embodiment according to techniques herein.

Referring to FIG. 14, shown is a flowchart of processing steps that may be performed in an embodiment in accordance with techniques described herein. The flowchart 700 summarizes processing in connection with the pseudo code description described above. At step 702, a priori information is obtained. This information may include one or more sets of sensor data and which one or more RTB input selections (e.g., decision space) are determined as appropriate for each set of sensor data. The sensor data may be previously observed sensor measurements obtained using sensors, measurements obtained using simulation, knowledge of an expert, and the like. The RTB inputs selected for use with each set of sensor data may be determined by an expert or knowledgeable individual skilled in the art. At step 704, an aircraft may be flown to obtain a current set of sensor data Z characterizing the current vibration of the aircraft at one or more regimes. The sensor data may include virtual sensor data based on one or more actual observed sensor data measurements. At step 706, Y1 may be calculated as $(Z-M_1)^2 * INF1$, where $M_1$ is the first set of a priori sensor data and INF1 is the preference or priority information for $M_1$. At step 708, T1 is calculated as the product of all INF or preference (information) values for $M_1$. At step 710, i=2. At step 710, H(i) is calculated. At step 714, a determination is made as to whether "i" denotes the last decision space. If not, i is incremented in steps 716 and control proceeds to step 712. If step 714 evaluates to yes, control proceeds to step 718 where a determination is made as to whether all H(i) values are less than zero. If so, control proceeds to step 722 to selected decision space 1 (corresponding to the null hypothesis) and use its RTB input selection options for the current sensor data Z. Otherwise, if step 718 evaluates to no, control proceeds to step 720 where the decision space XX selected, where H(XX) is the maximum of all H(i)s, i=2 . . . K, for K decision spaces.

The techniques herein may be performed by a processor, such as a of a computer system, executing code stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A computer implemented method of selecting options for use with current sensor data comprising:
receiving, using a processor, the current sensor data characterizing vibration caused by rotating blades;
evaluating, using a processor, one or more sets of other data to determine a first of the one or more sets of other sensor data that is a best match for said current sensor data, each of said one or more sets of other sensor data being associated with one of a plurality of option sets, each of said plurality of option sets including one or more options selected as active in connection with determining one or more adjustments to the blades to reduce vibration, wherein said one option set associated with said each set of other sensor data indicates options previously determined as appropriate for use in connection with determining adjustments to the blades when said each set of other sensor data characterizes a current state of vibration caused by rotating the blades, each of said one or more sets of other sensor data being associate with a weight denoting a preference of said each set of other sensor data set, wherein a first of said sets of other sensor data has a first weight and a second of said sets of other sensor data has a second weight, and wherein if said first set of other sensor data has a larger variance than said second set, said first weight is less than said second weight;
determining, in accordance with said evaluating, that a first of the plurality of option sets associated with said first set of other sensor data identifies a best set of one or more options including one or more adjustment types for use in determining one or more adjustments to the blades given the current sensor data; and
determining said one or more adjustments to the blades, wherein said determining is performed using a processor and the first option set associated with said first set of other sensor data, wherein said first option set identifies one or more options which are active and said determining determines an adjustment from different candidate adjustments for each option that is identified as active in said first option set and denotes an adjustment type.

2. The computer implemented method of claim 1, wherein each of said plurality of option sets indicates selection of options from a plurality of options, said plurality of options including at least one of a plurality of adjustment types, whether to determine an adjustment using vibration sensor data alone or in combination with track split data, and one or a plurality of solution strategies.

3. The computer implemented method of claim 2, wherein said first option set includes said one or more of said adjustment types and a first of said plurality of solution strategies.

4. The computer implemented method of claim 3, further comprising:
determining an adjustment to the blades in accordance with options of said first option set, said adjustment being a best adjustment determined by evaluating different combinations of adjustments of said one or more adjustment types including in said first option set using said first solution strategy.

5. The computer implemented method of claim 2, wherein said plurality of adjustment types includes a weight adjustment, a pitch control rod adjustment, and or more tab adjustments.

6. The computer implemented method of claim 1, wherein said sets of other sensor data are associated with said weights used as values used to weight said sets of other sensor data when evaluating which of said sets of other sensor data is best match for said current sensor data.

7. The computer implemented method of claim 6, wherein said evaluating includes determining, for each set of other sensor data, a normalized distance between said current sensor data and said each set of other sensor data.

8. The computer implemented The method of claim 7, wherein said normalized distance is squared and weighted using said weight associated with said each set of other sensor data.

9. The computer implemented method of claim 1, wherein said one or more sets of other sensor data includes sensor data for a plurality of different sensors.

10. The computer implemented method of claim 9, wherein said one or more sets of other sensor data includes sensor data for at least one sensor at a plurality of different flight regimes.

11. The computer implemented method of claim 9, wherein at least one of the plurality of different sensor is a virtual sensor.

12. The computer implemented method of claim 1, wherein said one or more sets of other sensor data includes sensor data for one or more different vibration shaft orders.

13. A computer implemented method of selecting options for use with current sensor data comprising:
receiving, using a processor, the current sensor data characterizing vibration caused by rotating blades;
evaluating, using a processor, one or more sets of other sensor data to determine a first of the one or more sets of other sensor data that is a best match for said current sensor data, each of said one or more sets of other sensor data being associated with one of a plurality of option sets, each of said plurality of option sets including one or more options for use in connection with determining one or more adjustments to the blades to reduce vibration, wherein said one option set associated with said each set of other sensor data indicates options previously determined as appropriate for use in connection with determining adjustments to the blades when said each set of other sensor data characterizes a current state of vibration caused by rotating the blades; and
using a processor and a first of the plurality of option sets associated with said first set of other sensor data in connection with determining one or more adjustments to the blades, wherein said sets of other sensor data are associated with values used to weight said sets of other sensor data when evaluating which of said sets of other sensor data is a best match for said current sensor data, wherein said evaluating includes determining, for each set of other sensor data, a normalized distance between said current sensor data and said each set of other sensor data, wherein said normalized distance is squared and weighted, and wherein there are K sets of other sensor data, each of said sets of other sensor data represented as $M_i$ "i" ranging from 1 to K, inclusively, and the method includes determining, for each Mj, j ranging from 2 to K, inclusively:

$$Hj = (z - M_1)^2 INF_1 - (z - M_j)^2 INF_j + \ln\left[\frac{\prod INF_j}{\prod INF_1}\right]$$

with respect to M1 and each Mj, where Hj represents an equation for hypothesis testing associated with the sets of other sensor data $M_i$ and $M_j$, $INF_1$ and $INF_j$ represent weighting factors, $\Pi\, INF_1$ represents a mathematical product of weighting factors associated with $INF_1$, $\Pi\, INF_j$ represents a mathematical product of weighting factors associated with $INF_j$, and z represents the current sensor data.

14. The computer implemented method of claim 13, wherein one of said option sets is associated with each $M_i$ and the method includes:
selecting an option set associated with $M_1$ as said first option set if all Hj values are less than zero, Hj being determined with respect to $M_1$ and Mj, and otherwise, determining which one of said "j" sets of other sensor data produces a maximum Hj value, and selecting, as said first option set, an option set associated with said one set of sensor data producing the maximum Hj value.

15. A system that determines adjustments to decrease vibration caused by rotating blades comprising:
a data store including a priori information about what one or more options are appropriate for use in connection with determining one or more adjustments that may be applied to the blades for each of different sets of sensor data;
an option selection component that evaluates said different sets of sensor data to determine which of said different sets of sensor data is a best match for a current set of sensor data characterizing a current state of measured vibration of the rotating blades, said option selection component selecting the one or more options which are included in said a priori information denoting options selected as active when determining adjustments for the blades, and which are associated with a first of said different sets of sensor data determined as the best match, wherein said one or more options selected are identified as a best set of one or more options including one or more adjustment types for use in determining one or more adjustments to the blades given the current sensor data, wherein said a priori information includes a weight associated with each of said different sets of sensor data denoting a preference of said each different set of sensor data, wherein a first of said different sets of sensor data has a first weight and a second of said different sets of sensor data has a second weight, and wherein if said first of said different sets of sensor data has a larger variance than said second of said different sets of sensor data, said first weight is less than said second weight; and
an adjustment determination component that determines one or more adjustments which are best adjustments in accordance with said one or more options selected by the option selection component; and
wherein the one or more options selected by the option selection component identify those options which are active when the one or more adjustments are determined by the adjustment determination component whereby the adjustment determination component determines an adjustment from different candidate adjustments for each option that is identified as active by the option selection component and denotes an adjustment type.

16. The system of claim 15, wherein said a priori information indicates which of a plurality of options are appropriate for use with each of the different sets of sensor data, the plurality of options including one or more adjustment types, whether to determine an adjustment for the component using vibration sensor data alone or in combination with track split data, and one of a plurality of solution strategies.

17. The system of claim 16, wherein said one or more adjustment types includes one or more of a weight adjustment, a pitch control rod adjustment, one or more tab adjustments.

18. The system of claim 15, wherein the different sets of sensor data include sensor data for a plurality of different sensors at a plurality of different flight regimes for one or more vibration orders.

19. A non-transitory computer readable medium comprising executable code stored thereon that selects options for use with current sensor data, the non-transitory computer readable medium comprising executable code that:
receives the current sensor data characterizing vibration caused by rotating blades;
evaluates one or more sets of other sensor data to determine a first of the one or more sets of other sensor data that is best match for said current sensor data, each of said one or more sets of other sensor data being associated with one of a plurality of option sets, each of said plurality of options sets including one or more options selected as active in connection with determining one or more adjustments to the blades to reduce vibration, wherein said one option set associated with said each set of other sensor data indicates options previously determined as appropriate for use in connection with determining adjustments to the blades when said each set of other sensor data characterizes a current state of vibration caused by rotating the blades, each of said one or more sets of other sensor data being associated with a weight denoting a preference of said each set of other sensor data set, wherein a first of said sets of other sensor data has a first weight and a second of said sets of other sensor data has a second weight, and wherein if said first set of other sensor data has a larger variance than said second set, said first weight is less than said second weight;
determines, in accordance with said evaluates, that a first of the plurality of option sets associated with said first set of other sensor data identifies a best set of one or more options including one or more adjustment types for use in determining one or more adjustments to the blades given the current sensor data; and
determines said one or more adjustments to the blades, wherein determining the one or more adjustments is performing using a processor and the first option set associated with said first set of other sensor data, wherein said first option set identifies one or more options which are active and said determining determines an adjustment from different candidate adjustments for each option that is identified as active in said first option set and denotes an adjustment type.

* * * * *